(12) United States Patent  
Sakai et al.

(10) Patent No.: US 8,788,567 B2  
(45) Date of Patent: Jul. 22, 2014

(54) INFORMATION PROCESSING APPARATUS, INFORMATION PROCESSING SYSTEM, INFORMATION PROCESSING METHOD, AND PROGRAM

(75) Inventors: Shimon Sakai, Kanagawa (JP); Masayuki Ebata, Kanagawa (JP); Naoki Ode, Chiba (JP); Keiichi Aoyama, Tokyo (JP)

(73) Assignee: Sony Corporation (JP)

( * ) Notice: Subject to any disclaimer, the term of this patent is extended or adjusted under 35 U.S.C. 154(b) by 515 days.

(21) Appl. No.: 12/589,569

(22) Filed: Oct. 23, 2009

(65) Prior Publication Data

US 2010/0121900 A1 May 13, 2010

(30) Foreign Application Priority Data

Nov. 10, 2008 (JP) ................. P2008-287513

(51) Int. Cl.
- *G06F 15/16* (2006.01)
- *G06F 17/00* (2006.01)
- *G06F 3/00* (2006.01)

(52) U.S. Cl.
USPC ........... 709/201; 709/202; 709/205; 709/249; 715/273; 715/700

(58) Field of Classification Search
None
See application file for complete search history.

(56) References Cited

U.S. PATENT DOCUMENTS

| 6,266,614 | B1 * | 7/2001 | Alumbaugh | 701/468 |
| 7,469,163 | B2 * | 12/2008 | Hatayama et al. | 700/17 |
| 2003/0158789 | A1 * | 8/2003 | Miura et al. | 705/26 |
| 2006/0233266 | A1 * | 10/2006 | Suetsugu | 375/259 |
| 2007/0136282 | A1 * | 6/2007 | Takashima | 707/6 |
| 2008/0168394 | A1 * | 7/2008 | Kawasaki | 715/811 |
| 2008/0320039 | A1 * | 12/2008 | Ohwa | 707/103 R |

FOREIGN PATENT DOCUMENTS

| JP | 11177919 | 7/1999 |
| JP | 2002073436 A | 3/2002 |
| JP | 2003006133 A | 1/2003 |
| JP | 2005117448 A | 4/2005 |
| JP | 2005157419 A | 6/2005 |
| JP | 2006094211 A | 4/2006 |

(Continued)

OTHER PUBLICATIONS

Office Action from Japanese Application No. 2008-287513, dated Oct. 25, 2011.

(Continued)

*Primary Examiner* — Ranodhi Serrao
*Assistant Examiner* — Farrukh Hussain
(74) *Attorney, Agent, or Firm* — Lerner, David, Littenberg, Krumholz & Mentlik, LLP

(57) ABSTRACT

There is provided an information processing apparatus including an information acquiring unit for acquiring, from external apparatuses connected via a network, processing information about a processing to be executed by each of the external apparatuses and/or about a result of a processing executed thereby and information about a function that each of the external apparatuses can execute in cooperation with the information processing apparatus; an information display unit for displaying the processing information of each of the external apparatuses and program information about program contents and displaying, on the basis of the information about the function of each of the external apparatuses, functions that can be executed by each of the external apparatuses with respect to the one or more program contents; and a function execution unit for causing the external apparatus to execute a selected function with respect to a selected program content.

16 Claims, 15 Drawing Sheets

(56) References Cited

FOREIGN PATENT DOCUMENTS

| | | |
|---|---|---|
| JP | 2006246531 A | 9/2006 |
| JP | 2006-319960 A | 11/2006 |
| JP | 2007052594 A | 3/2007 |
| JP | 2007124534 A | 5/2007 |
| JP | 2007133796 A | 5/2007 |
| WO | 2005072002 A1 | 8/2005 |
| WO | 2005073450 A1 | 8/2005 |

OTHER PUBLICATIONS

Office Action from Japanese Application No. 2008-287513, dated Jun. 19, 2012.

Office Action from Japanese Application No. 2012-205517, dated Aug. 13, 2013.

Office Action from Japanese Application No. 2012-205517, dated Oct. 22, 2013.

* cited by examiner

FIG. 11

| DEVICE DEFINITION INFORMATION | |
|---|---|
| DEVICE ID | IDENTIFIER UNIQUE TO APPARATUS |
| DEVICE NAME | NAME OF APPARATUS |
| DEVICE ADDRESS | ADDRESS IN NETWORK, SUCH AS IP ADDRESS AND HOST NAME |
| DEVICE SUPPLEMENTARY INFORMATION | SUPPLEMENTARY INFORMATION ARBITRARILY SET |

| SERVICE DEFINITION INFORMATION | |
|---|---|
| SERVICE NAME | NAME OF SERVICE |
| SERVICE VERSION | VERSION INFORMATION OF SERVICE |
| SERVICE LOCATION PATH | RPC PROTOCOL, DEVICE ID, AND SERVICE LOCATION INFORMATION OF APPARATUS |
| SERVICE PROVIDING DEVICE ID | IDENTIFIER CORRESPONDING TO DEVICE ID OF DEVICE DEFINITION INFORMATION |
| SERVICE SUPPLEMENTARY INFORMATION | SUPPLEMENTARY INFORMATION ARBITRARILY SET |

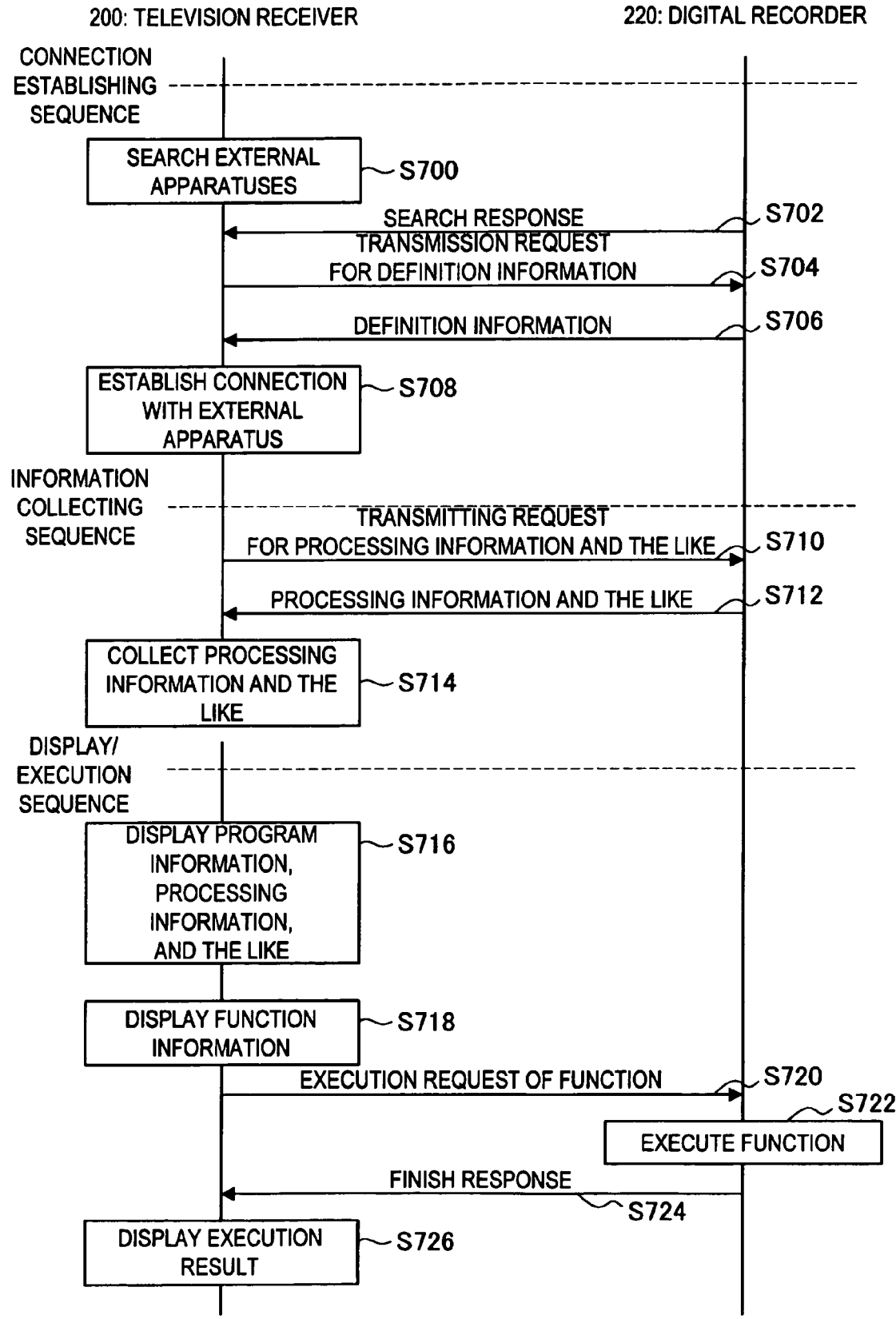

FIG. 14

| PROGRAM TABLE MENU | | | | 8/31 PM 9:05 |
|---|---|---|---|---|
| 8/31 | ⇩ ATV CH101 | BTV CH102 | CTV CH103 | |
| PM9 | OO SPORTS 21 (RECORDER RECORDING) | OO NEWS 9 PM | OO SPORTS HIGHLIGHT | ⇧ … |
| PM10 | OO NEWS 22 | OO SPORTS 10 PM (TV TIMER RECORDING) | OO BS CINEMA "TRUCK DRIVER" | ⇧ … |
| PM11 | OO DRAMA 23 | OO NEWS 11 PM | | ⇧ … |
| … ⇩ | ⇨ … | ⇨ … | ⇨ … | ⇧ … |

(BLUE) CURRENT   (RED) TOMORROW   (GREEN) CHANNEL SELECT   (YELLOW) ENLARGE/REDUCE   (DECIDE) DETAILS OF PROGRAM   (GO BACK) TERMINATE

INFORMATION PROCESSING APPARATUS, INFORMATION PROCESSING SYSTEM, INFORMATION PROCESSING METHOD, AND PROGRAM

CROSS-REFERENCE TO RELATED APPLICATION

The present application claims priority from Japanese Patent Application No. JP 2008-287513 filed in the Japanese Patent Office on Nov. 10, 2008, the entire content of which is incorporated herein by reference.

BACKGROUND OF THE INVENTION

1. Field of the Invention

The present invention relates to an information processing apparatus, an information processing system, an information processing method, and a program.

2. Description of the Related Art

Various systems have been devised, wherein a plurality of apparatuses are connected to a home network installed in a home, and the apparatuses operate in cooperation with each other and perform remote controls. Examples of such systems include, a telephone connected to a telephone line and a television which cooperate with each other to achieve an automatic control such as automatically turning down the volume of the television when an incoming call is received.

Japanese Patent Application Laid-Open No. 2006-319960 discloses a system including a home server connected to a home network, wherein the home server has information about cooperating apparatuses and cooperation control information to achieve cooperation between the apparatuses on the home network. In this system, the home server stores information, such as about each apparatus and information about the content of operations that can be achieved by one or more apparatuses cooperating with each other, and the apparatuses connected to the home network are associated with each other on the basis of the above information, so that the apparatuses cooperate with each other.

SUMMARY OF THE INVENTION

Since the system disclosed in Japanese Patent Application Laid-Open No. 2006-319960 requires the home server for allowing the apparatuses to cooperate with each other, the apparatuses cannot cooperate with each other if there is no home server or if the home server does not have any information about the apparatuses which are to cooperate with each other.

Alternatively, each apparatus may be configured to have information for cooperation with each other so as to cooperate with each other without depending on any server. In such case, if one of the apparatuses is replaced with a new apparatus due to replacement purchase and the like, the other of the apparatuses may fail to achieve cooperation since the other of the apparatuses does not have any information about the new apparatus. To prevent failure, a mechanism is additionally required to update information about the cooperating apparatus stored in the old apparatus.

Further, when the apparatuses cooperate with each other, it is necessary for a user to operate each apparatus separately since each apparatus has as individual interface. Therefore, a user is required to perform cumbersome operations, which may result in erroneous operations, and the convenience of the system does not necessarily improve. For example, when a plurality of apparatuses cooperate with each other in a system including the plurality of recording apparatuses, a user performs recording and timer recording operations on each of the recording apparatuses. Therefore, the user is required to perform cumbersome operations, and, for example, the user may cause the plurality of recording apparatuses to record the same program due to erroneous operation. Further, since program contents are recommended based on preference information managed separately by each recording apparatus, the user may fail to appropriately select a program matching the user's preference.

In light of the foregoing, it is desirable to provide a novel and improved information processing apparatus, an information processing system, an information processing method, and a program capable of cooperating without any dependence relation between the information processing apparatuses.

According to an embodiment of the present invention, there is provided an information processing apparatus including an information acquiring unit for acquiring, from one or more external apparatuses connected via a network, processing information about a processing to be executed by each of the external apparatuses and/or about a result of a processing executed thereby and information about a function that each of the external apparatuses can execute in cooperation with the information processing apparatus, an information display unit for displaying the processing information of each of the external apparatuses and program information about one or more program contents and displaying, on the basis of the information about the function of each of the external apparatuses, one or more functions that can be executed by each of the external apparatuses with respect to the one or more program contents, and a function execution unit for causing one or more of the external apparatuses capable of executing a function selected from among the one or more functions to execute the selected function with respect to a program content selected from among the one or more program contents.

In the above configuration, the processing information and the information about the functions of one or more external apparatuses are acquired from the external apparatus, and the acquired information are displayed along with the program information about one or more program contents. Further, the user can cause the external apparatus to execute the selected function with respect to the selected program content. Therefore, the information processing apparatuses can cooperate without any dependence relation between the information processing apparatuses. Further, cumbersome operations are not necessary and erroneous operations can be prevented, and the convenience of cooperation between apparatuses can be improved.

According to another embodiment of the present invention, there is provided an information processing apparatus including an information providing unit for providing, to an external apparatuses connected via a network, processing information about a processing to be executed by the information processing apparatus and/or about a result of a processing executed thereby and information about a function that the information processing apparatus can execute in cooperation with one or more of the external apparatus, a function execution unit for executing a function, selected on the external apparatuses from among the one or more functions, with respect to a program content selected on the external apparatuses from among the one or more program contents, wherein along with the program information about the one or more program contents, one or more of the external apparatuses display the processing information and display, on the basis of the information about the function, the one or more functions that can be executed with respect to the one or more program contents.

In the above configuration, the processing information and the information about the functions are provided to the external apparatus, and are displayed along with the program information about the program content. Further, the external apparatus can execute the selected function with respect to the program content selected on the external apparatus. Therefore, the information processing apparatuses can cooperate without any dependence relation between the information processing apparatuses. Further, cumbersome operations are not necessary and erroneous operations can be prevented, and the convenience of cooperation between apparatuses can be improved.

According to the above-described embodiments of the present invention, there is provided an information processing system including the information processing apparatus. An information processing method applicable to the information processing apparatus according to the above-described embodiments of the present invention is provided. A computer-readable storage medium having a program recorded thereon for causing a computer to execute the information processing method according to the above-described embodiments of the present invention is provided.

According to another embodiment of the present invention, there is provided an information processing apparatus including a receiving unit for receiving, from an external apparatus connected to the information processing apparatus via a network, function information about one or more functions of the external apparatus and a function display request for displaying a list of the functions included in the function information, a display unit for displaying, in response to the function display request, the list of the functions of the external apparatus included in the function information, a selection receiving unit for receiving information representing one or more of the functions selected by a user from among the list of the functions displayed on the display unit, and a cooperation function execution unit for causing the external apparatus to execute one or more of the functions selected by the user.

In the above configuration, when a plurality of apparatuses cooperate with each other, an apparatus can display information about a function of another apparatus, and the function of the another apparatus can be executed by operating the apparatus displaying the information, even though the apparatuses do not previously store information about each other.

According to another embodiment of the present invention, there is provided an information processing apparatus including an external apparatus search unit for searching an external apparatus connected via a network, and a transmitting unit for transmitting, to the external apparatus, function information about one or more functions and a function display request for causing the external apparatus to display a list of the one or more functions.

In the above configuration, when a plurality of apparatuses cooperate with each other, an apparatus can display information about a function of another apparatus, and the function of the another apparatus can be executed by operating the apparatus displaying the information, even though the apparatuses do not previously store information about each other.

An information processing method applicable to the information processing apparatus according to an embodiment of the present invention is provided.

According to an embodiment of the present invention, there is provided the information processing apparatus, the information processing system, the information processing method, and the program which enable cooperation without any dependence relation between the information processing apparatuses.

BRIEF DESCRIPTION OF THE DRAWINGS

FIG. 11 is a figure showing a configuration of definition information;

FIG. 12 is a figure showing an execution sequence of the cooperation function of the system;

FIG. 14 is a figure showing an exemplary execution of the cooperation function for collectively displaying recording/timer recording information of the television receiver and the digital recorder on the television receiver by using a program recording service.

DETAILED DESCRIPTION OF EMBODIMENT

Figure 1:
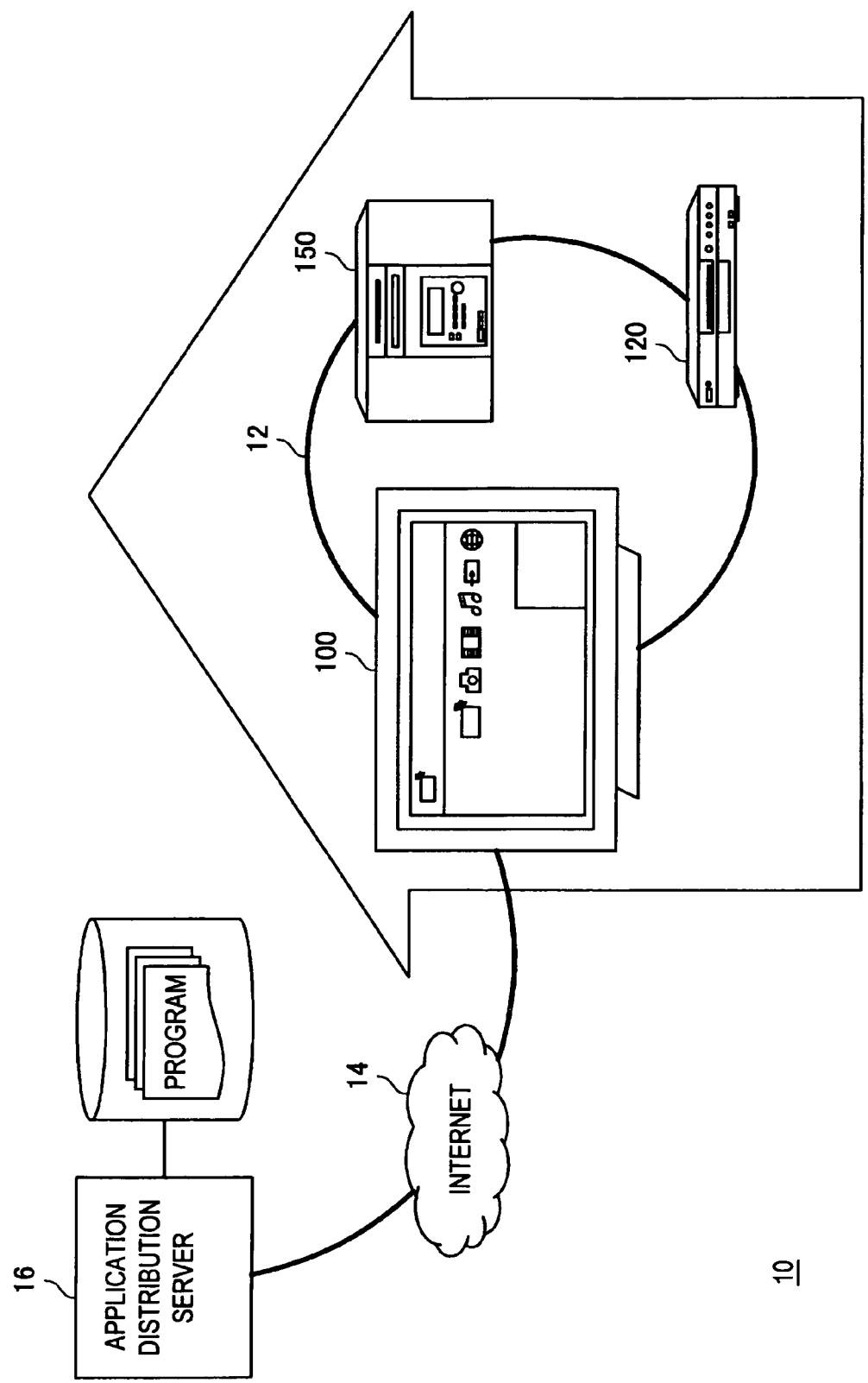
FIG. 1 is a figure showing a configuration of a home network system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

First, a home network system 10 according a first embodiment of the present invention will be described with reference to FIG. 1. FIG. 1 is a figure schematically showing a configuration of the home network system 10 according to the first embodiment of the present invention.

As shown in FIG. 1, the home network system 10 according to the present embodiment includes a television receiver 100, a digital recorder 120, an audio apparatus 150, and the like which are connected a home network 12 installed in a home and the like. The television receiver 100 and the digital recorder 120 are examples of an information processing apparatus and an external apparatus according to the present embodiment, respectively.

In the embodiment described below, the television receiver and the digital recorder are explained as examples of the information processing apparatuses cooperating with each other, but the present invention is not limited thereto. The information processing apparatus and the external apparatus may be, for example, an audio apparatus, a home video game machine, a mobile phone, a camera, a digital camera, and the like.

The television receiver 100 receives a program content of a television program broadcast by a broadcast station via a receiving antenna installed outdoors or via a video distribution IP network, and outputs the received program content. The television receiver 100 includes a display for displaying video and a speaker for outputting audio. The television receiver 100 coverts data of the received program content into video and audio, and outputs the video and the audio to the display and the speaker.

The television receiver 100 is connected to an apparatus such as the digital recorder 120 via the home network 12. The television receiver 100 can search apparatuses in the home network 12 using UPnP (Universal Plug and Play) and Multicast DNS (Domain Name System), for example, and can directly communicate thereto. For example, the television receiver 100 can acquire the IP address of the digital recorder 120, acquire information and setting information about the functions of the digital recorder 120, and notify another apparatus of information, setting information, and the like about the functions of the television receiver 100 itself.

Further, the television receiver 100 is connected to an Internet 14, and has a function of downloading an application from an application distribution server 16 on the Internet 14 and executing the application.

The digital recorder 120 receives a program content of a television program broadcast by a broadcast station via a receiving antenna installed outdoors or via a video distribution IP network, and records the program content on a recording medium such as DVD and HDD or reproduces the content recorded on the recording medium. The digital recorder 120 is also connected to the home network 12 in the same manner as the television receiver 100, and can directly communicate with the television receiver 100 and the like via the home network 12.

[Configuration of the Television Receiver 100]

Figure 2:
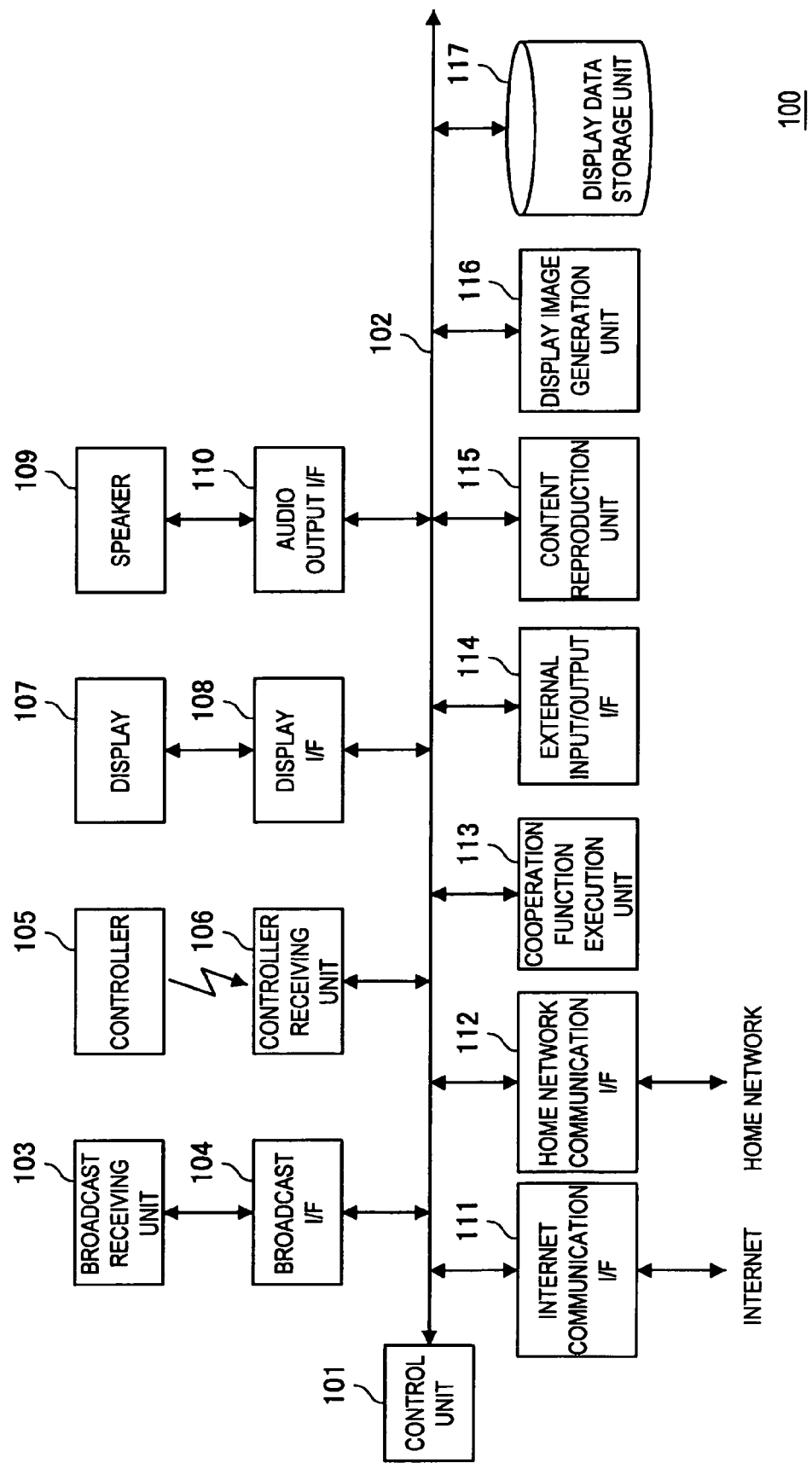
FIG. 2 is a block diagram schematically showing a configuration of a television receiver included in the system shown in FIG. 1.

Next, the configuration of the television receiver 100 will be described with reference to FIG. 2. FIG. 2 is a block diagram schematically showing the configuration of the television receiver 100. As shown in FIG. 2, the television receiver 100 includes a control unit 101, a broadcast receiving unit 103, a broadcast interface (I/F) 104, a controller receiving unit 106, a display 107, a display interface (I/F) 108, a speaker 109, an audio output interface (I/F) 110, an Internet communication interface (I/F) 111, a home network communication interface (I/F) 112, a cooperation function execution unit 113, an external input/output interface (I/F) 114, a content reproduction unit 115, a display image generation unit 116, and a display data storage unit 117. Each unit of the television receiver 100 will be hereinafter explained.

The control unit 101 is a functional unit, which is connected to each functional unit via a connection bus 102, for executing the functions of the television receiver 100 by controlling each functional unit. For example, the control unit 101 performs controls so that the content reproduction unit 115 and the display image generation unit 116 convert data of the program content received by the broadcast receiving unit 103 into a display image and then the display image is displayed on the display 107. Alternatively, the control unit 100 controls other functional units to receive a request signal received by the controller receiving unit 106 and execute a processing according to the request signal.

The broadcast receiving unit 103 receives a program content via the receiving antenna or via the video distribution IP network, and transmits the program content to the connection bus 102 via the broadcast I/F 104. The controller receiving unit 106 receives a command signal transmitted by infrared light and the like from a controller 105 operated by a user. The received command signal is transferred to the control unit 101 via the connection bus 102.

The display 107 is a display apparatus for displaying an image such as a program content generated by the display image generation unit 116. The display 107 receives a display image input via the display I/F 108, and displays the display image. The speaker 109 is an output apparatus for outputting audio, and outputs the audio that is input via the audio output I/F 110.

The Internet communication I/F 111 is an interface for communicating with the application distribution server 16 via the Internet 14. According to the control of the control unit 101, the Internet communication I/F 111 connects to the application distribution server 16 located at a specified URL and downloads a corresponding application program The home network communication I/F 112 is connected to the home network 12, and communicates with another apparatus connected to the home network 12, such as the digital recorder 120. The home network communication I/F 112 transfers data received from an external apparatus on the home network 12, such as the digital recorder 120, to the control unit 101, and transmits data input from the control unit 101 to an external apparatus via the home network 12.

Upon a function display request received from an external apparatus on the home network 12, the cooperation function execution unit 113 performs a processing for causing the requester external apparatus to execute a function selected by a user from among the cooperation functions displayed the display 107. Specifically, the cooperation function execution unit 113 notifies the external apparatus of the function selected by the user (in a case of an embedded-type, to be described later), and downloads an application program corresponding to the selected function from the application distribution server 16 on the Internet 14 and executes the application program (in a case of a download-type, to be described later).

The external input/output interface 114 is an interface for connecting between the television receiver 100 and an apparatus such as the digital recorder 120 and a digital video camera. The external input/output interface 114 serves as an interface for inputting video and audio output from the digital recorder 120, the digital video camera, and the like, or externally outputting video and the like received by the television receiver 100.

The content reproduction unit 115 performs a function for reproducing the video of the program content received by the broadcast receiving unit 103. For example, the content reproduction unit 115 separates the packets of the program content received by the broadcast receiving unit 103 via a video distribution IP network into signals of audio, video, data, and the like, decodes each of the separated signals, and then input the separated signals to the display image generation unit 116 and the like.

The display image generation unit 116 generates a display image to be displayed on the display 107, upon receiving: the video signal and the data signal decoded by the content reproduction unit 115; display data stored in the display data storage unit 117; and the like. The display data storage unit 117 is a storage unit for storing display data such as various kinds of icons and characters to be displayed on the display 107. The display data storage unit 117 also stores function display data and the like received from an external apparatus on the home network 12 via the home network communication I/F 112.

[Configuration of the Digital Recorder 120]

Figure 3:
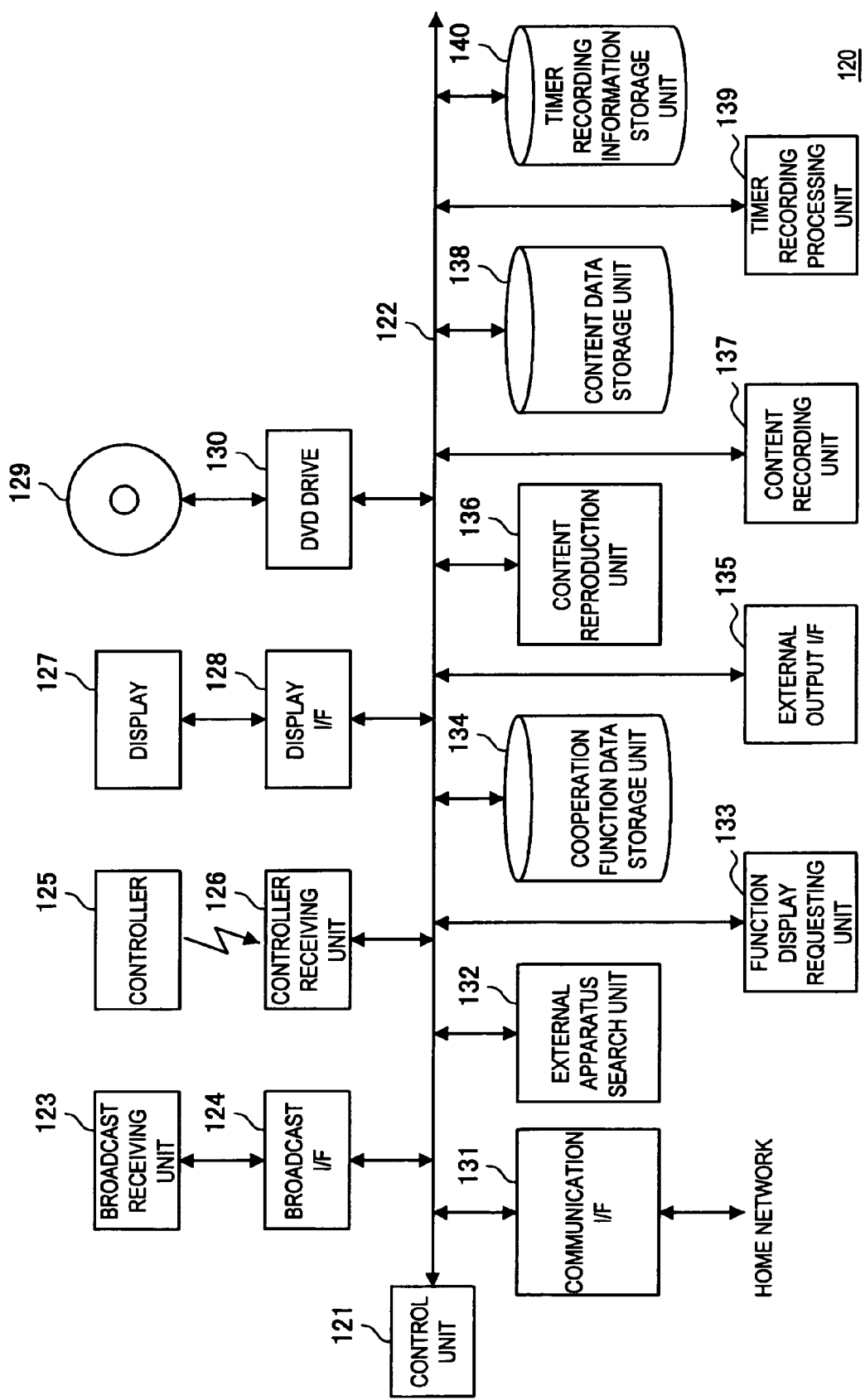
FIG. 3 is a block diagram schematically showing a configuration of a digital recorder included in the system shown in FIG. 1.

The configuration of the television receiver 100 has been explained above. Next, the configuration of the digital recorder 120 will be described with reference to FIG. 3. FIG. 3 is a block diagram schematically showing the configuration of the digital recorder 120. As shown in FIG. 3, the digital recorder 120 includes a control unit 121, a broadcast receiving unit 123, a broadcast interface (I/F) 124, a controller receiving unit 126, a display 127, a display interface (I/F) 128, a DVD drive 130, a communications interface (I/F) 131, an external apparatus search unit 132, a function display requesting unit 133, a cooperation function data storage unit 134, an external output interface (I/F) 135, a content reproduction unit 136, a content recording unit 137, a content data storage unit 138, a timer recording processing unit 139, and a timer recording information storage unit 140. Each unit of the digital recorder 120 will be hereinafter explained.

The control unit 121, the broadcast receiving unit 123, the broadcast I/F 124, the controller receiving unit 126, the display 127, and the display interface I/F 128 have the same functions as the corresponding components of the above-described television receiver 100, and therefore, the description will not be repeated.

The DVD drive 130 records data on the DVD 129 and reads data recorded on the DVD 129. The read data may be supplied to the content reproduction unit 136 or output to an external display apparatus such as the television receiver 100 via the external output I/F 135 by the control unit 121.

The communication I/F 131 is connected to the home network 12, and communicates with another apparatus connected to the home network 12, such as the television receiver 100. The external apparatus search unit 132 searches another apparatus on the home network 12 via the communication I/F 131, using UPnP (Universal Plug and Play) and Multicast DNS (Domain Name System), for example, and notifies information about the found apparatus such as an IP address to the control unit 121 and the like.

The function display requesting unit 133 transmits a function display request to the apparatus in the home network found by the external apparatus search unit 132 via the communication I/F 131. The function display request includes notifying an external apparatus of the functions of the digital recorder 120 (e.g., reproducing, recording, timer recording, and confirmation of timer recording information) and requesting the external apparatus to display the list of these functions on a display and the like provided on the external apparatus.

The cooperation function data storage unit 134 stores information about the functions that can be notified to an external apparatus by the function display requesting unit 133 (cooperation function data). The functions that can be notified are different depending on the type and the like of the external apparatus, and therefore, the cooperation function data are stored in association with the type of the corresponding external apparatus. The function display requesting unit 133 acquires from the cooperation function data storage unit 134 the cooperation function data corresponding to the external apparatus found by the external apparatus search unit 132, and transmits the cooperation function data to a target external apparatus via the communication I/F 131.

The cooperation function data stored in the cooperation function data storage unit 134 includes information about the type of an external apparatus and information about the functions to be displayed on the external apparatus. The information about the type of the external apparatus includes, for example, the model name of the external apparatus or the type of the model (e.g., digital recorder, game machine, audio apparatus, mobile phone, and camera). The information about the functions includes, for example, the name of the function (e.g., reproducing, recording, timer recording, and confirmation of timer recording information), the type of the functions (e.g., application and setting), a function ID, and behavior information about the function. The behavior information about the function is information for specifying an operation method when the function is selected on the external apparatus. The behavior information about the function includes information representing either of an embedded type for simply notifying information representing the selected function (e.g., the function ID) and a download type for downloading and executing an application program corresponding to the selected function. In a case of the download type, the behavior information about the function further includes a URL representing the location where the application program is acquired and the like.

The external output I/F 135 is an interface for outputting a display image and an audio, reproduced by the content reproduction unit 136, to a display apparatus such as the television receiver 100. The content reproduction unit 136 performs, e.g., data conversion and encode/decode processing for reproducing the DVD 129 loaded in the DVD drive 130 or the content data recorded in the content data storage unit 138

The content recording unit 137 performs, e.g., data conversion and encode/decode processing on the program content data received by the broadcast receiving unit 123 so that the program content data can be recorded on the DVD 129 loaded in the DVD drive 130 or in the content data storage unit 138. The content data storage unit 138 is a recording medium essentially including a hard disk to serve as a storage unit for storing the program content received by the broadcast receiving unit 123, for example.

The timer recording processing unit 139 is a functional unit for registering timer recording information about recording processing to be performed by the content recording unit 137. The timer recording processing unit 139 receives information about timer recording, which has been input by a user using the controller 125 through the controller receiving unit 126, and the timer recording processing unit 139 stores the received information about timer recording in the timer recording information storage unit 140. The timer recording information storage unit 140 stores the timer recording information stored in the timer recording processing unit 139. For example, the timer recording information storage unit 140 stores a channel number, recording start/end times, the name of the program, for example.

The configuration of the digital recorder 120 has been explained above.

[Cooperation Processing Between the Television Receiver 100 and the Digital Recorder 120]

Figure 4:
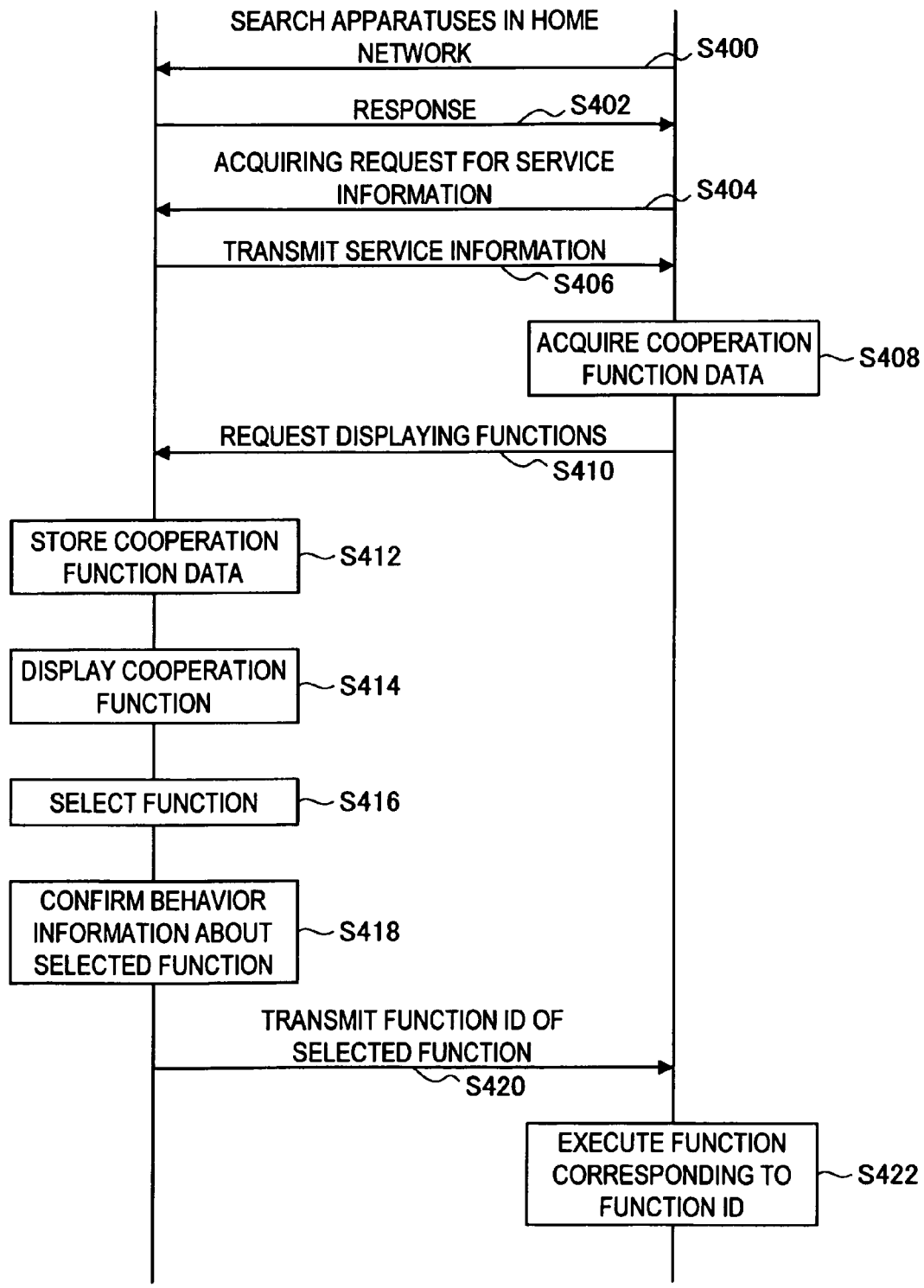
FIG. 4 is a sequence diagram showing the first example of a cooperation processing executed on the home network system.
Figure 6:
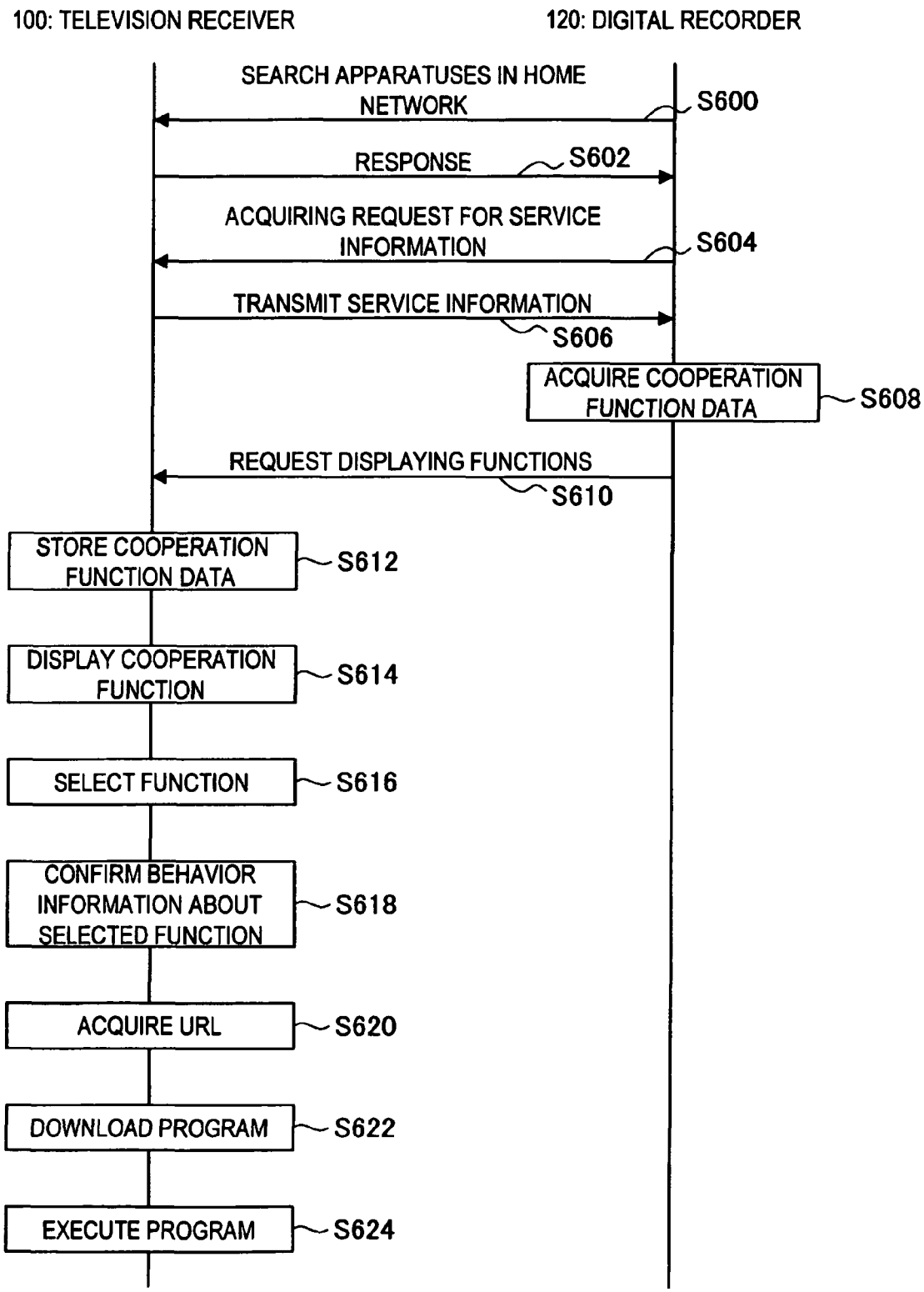
FIG. 6 is a sequence diagram showing the second example of the cooperation processing executed on the home network system.

Next, the cooperation processing performed by the television receiver 100 and the digital recorder 120 according to the present embodiment will be described with reference to FIGS. 4 and 6. FIG. 4 is a sequence diagram showing the first example of the cooperation processing executed on the home network system 10 according to the present embodiment. FIG. 6 is a sequence diagram showing the second example of the cooperation processing executed on the home network system 10 according to the present embodiment.

First Example

First, the first example of the cooperation processing performed by the television receiver 100 and the digital recorder 120 according to the present embodiment will be described with reference to FIG. 4. In the present example, the processing is explained on the assumption that the function of the digital recorder 120 selected by the television receiver 100 is the embedded type.

First, the external apparatus search unit 132 of the digital recorder 120 searches apparatuses in the home network 12 using UPnP (Universal Plug and Play) and Multicast DNS (Domain Name System), for example (step S400). Next, in response to an inquiry from the digital recorder 120, the television receiver 100 responds (step S402).

The digital recorder 120 transmits an acquiring request for acquiring service information to the responded apparatus (the television receiver 100) (step S404). The service information is information about services provided by the apparatus in cooperation with an external apparatus. By confirming the service information, an apparatus can confirm the functions that can be achieved through cooperation of a plurality of apparatuses. The television receiver 100 transmits, to the digital recorder 120, the service information indicating that the television receiver 100 has a function of displaying functions of an external apparatus (step S406).

The function display requesting unit 133 of the digital recorder 120 determines, from the service information received from the television receiver 100 in step S406, that the television receiver 100 is an apparatus capable of displaying functions of an external apparatus, and acquires the cooperation function data corresponding to the television receiver 100 from the cooperation function data storage unit 134 (step S408). Next, the digital recorder 120 transmits, to the television receiver 100, the function display request with the cooperation function data acquired in step S408 (step S410).

The television receiver 100 receives the function display request from the digital recorder 120 via the home network communication I/F 112, and stores the cooperation function data in the display data storage unit 117 (step S412). Next, the display image generation unit 116 of the television receiver 100 generates a display image to be displayed on the display 107 on the basis of the cooperation function data received from the digital recorder 120, and outputs the display image to the display 107 via the display I/F 108 (step S414).

Figure 5:
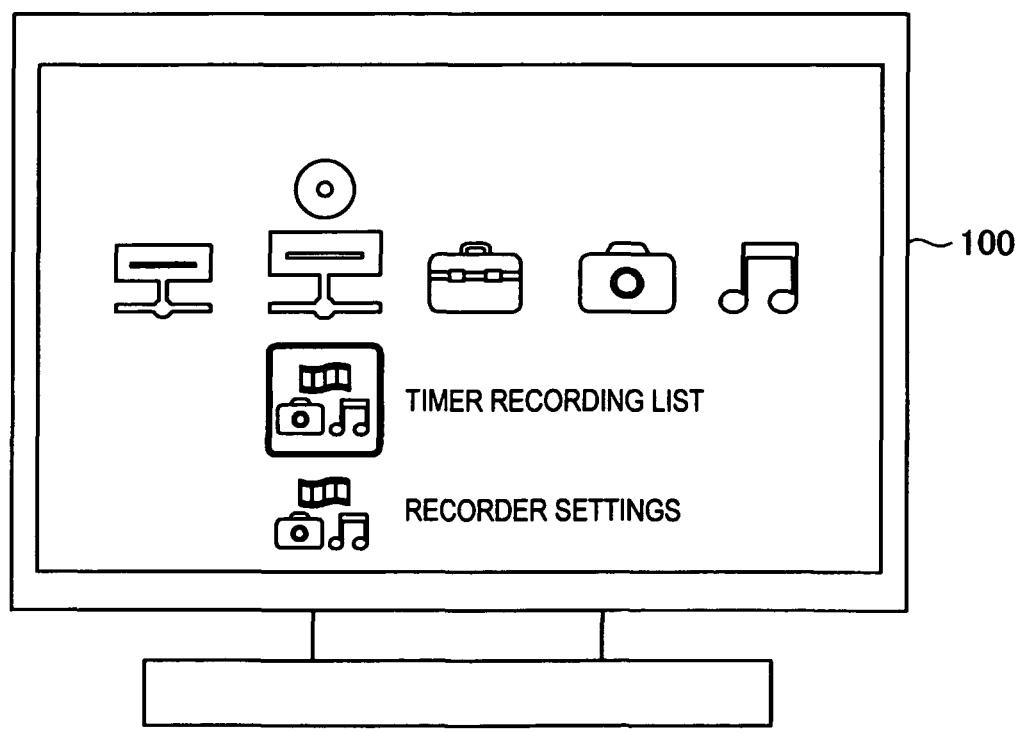
FIG. 5 is a figure showing an example of a function display screen displayed on the television receiver.

FIG. 5 is a figure showing an example of a display screen displayed on the display 107 in step S414. In the example of FIG. 5, the list of cooperation functions are shown as icons, and each icon represents a cooperating apparatus and a function of the cooperating apparatus. In the example of FIG. 5, a function of "Timer Recording List" and a function of "Recorder Settings" of the digital recorder 120 are shown. In this example, each icon shown is selectable by operating the controller 105. In the example of FIG. 5, the function of "Recorder Settings" of the digital recorder is selected.

At this time, when the user operates the controller 105, one of the functions shown on the display 107 is selected, and is input to the controller receiving unit 106 (step S416). The cooperation function execution unit 113 of the television receiver 100 receives a value received by the controller receiving unit 106, acquires the behavior information about the function from the cooperation function data stored in the display data storage unit 117, and then determines whether the selected function is the embedded type or the download type (step S418). In the following explanation of the present example, the selected function is assumed to be the embedded type.

Since the selected function is the embedded type, the cooperation function execution unit 113 acquires the function ID of the selected function from the cooperation function data, and transmits the function ID to the digital recorder 120 (step S420). Next, the digital recorder 120 performs a function corresponding to the function ID received from the television receiver 100. For example, the digital recorder 120 performs processing for displaying the list of the timer recording, change of setting information, or the like (step S422).

As described above, according to the cooperation method of the present invention, information about functions of an apparatus can be displayed on a display of another apparatus even though the apparatuses do not previously store information about each other, and a function of the apparatus can be selected and caused to be executed by operating a remote controller and the like of the another apparatus. Therefore, the apparatus can be operated by using the display screen and the remote controller of the displaying another apparatus.

Second Example

Next, the second example of the cooperation processing performed by the television receiver 100 and the digital recorder 120 according to the present embodiment will be described with reference to FIG. 6. In the present example, the processing is explained on the assumption that the function of the digital recorder 120 selected by the television receiver 100 is the download type. The processing from steps S600 to S616 in FIG. 6 are substantially the same as the processing from steps S400 to S416 of the above first example. Therefore, the explanations thereof will not be repeated and only the processing of step S618 and subsequent steps will be explained in the below.

In step S618, the cooperation function execution unit 113 of the television receiver 100 determines, from the behavior information about the function selected by the user's operation, whether the function is the embedded type or the download type, in the same manner as the processing in step S418 of the first example. In the second example, the selected function is the download type, and accordingly, the cooperation function execution unit 113 acquires the URL included in the behavior information (step S620).

Next, the television receiver 100 accesses the URL acquired in step S620 via the Internet communication I/F 111 to download the program (step S622). Next, the cooperation function execution unit 113 executes the downloaded program to cause the digital recorder 120 to execute the corresponding function (step S624). After executing the program, the cooperation function execution unit 113 may discard data of the downloaded program.

In the first example, the television receiver 100 simply transfers the function ID of the selected function to the digital recorder 120 so that the subsequent processing is performed by the digital recorder 120 itself. But in the second example, the television receiver 100 itself executes the program corresponding to the selected function so that the function of the digital recorder 120 is operated.

For example, when the function of "Recorder Setting" is selected from among the functions of the digital recorder displayed on the television receiver 100, the television receiver 100 downloads and executes a program for carrying out "Recorder Setting". This program is for communicating with the digital recorder 120 via the home network communication I/F 112, reading setting information of the digital recorder 120, and displaying the setting information on the display 107 of the television receiver 100.

Therefore, the user can, check the setting information of the digital recorder 120, change a setting value by operating the controller 105 of the television receiver 100, and the like while checking the display 107 of the television receiver 100. As described above, according to the cooperation method of the second example, the user can perform a more complicated operation on an apparatus by operating another apparatus.

Second Embodiment

Figure 7:
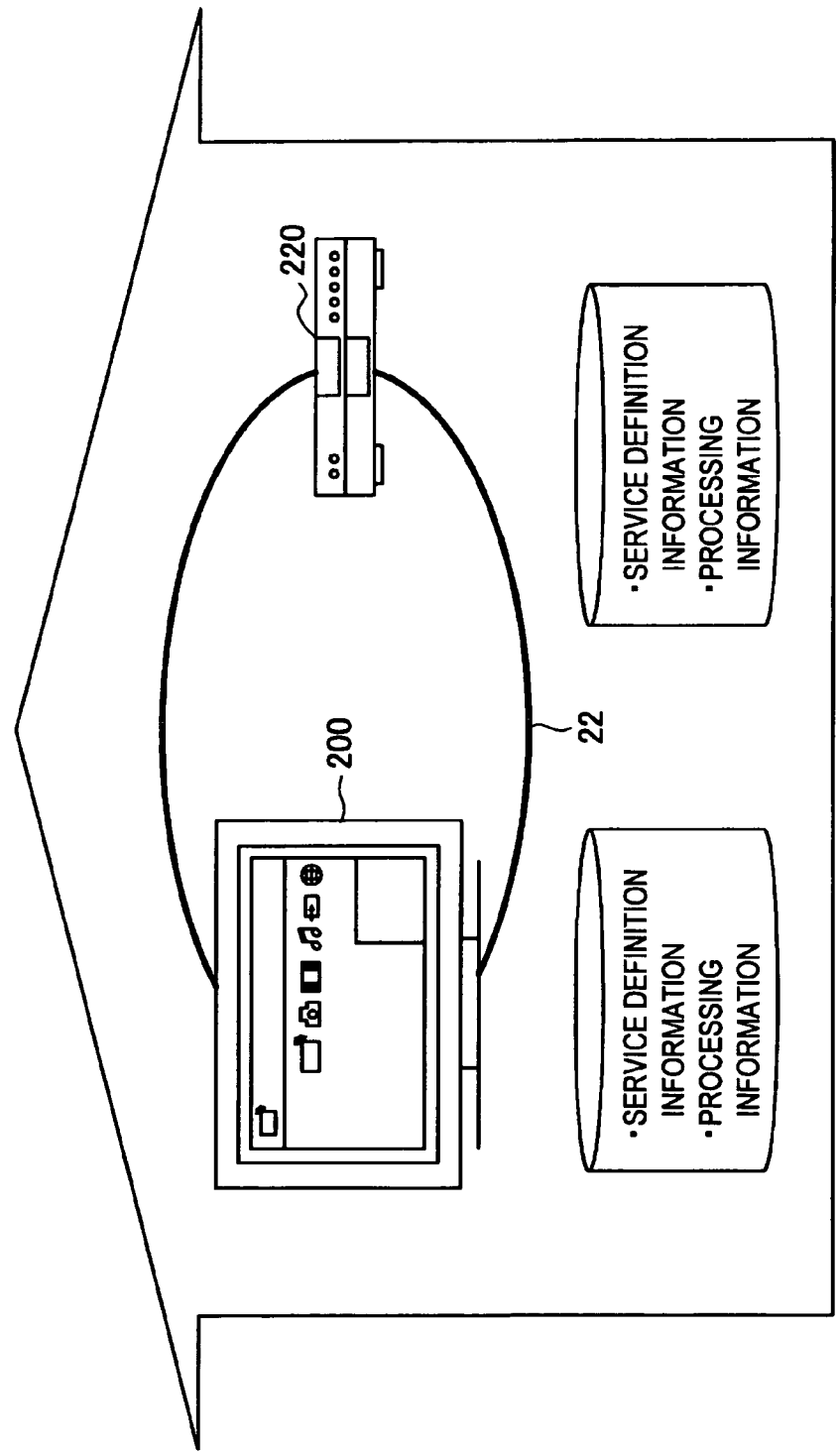
FIG. 7 is a figure showing a configuration of a home network system according to a second embodiment of the present invention.

First, a configuration of a home network system 20 according the second embodiment of the present invention will be described with reference to FIG. 7. As shown in FIG. 7, the home network system 20 according to the present embodiment includes apparatuses such as a television receiver 200 and a digital recorder 220 which are connected a home network 22 similarly to the home network system 10 according to the first embodiment.

Each apparatus on the home network 22 has service definition information (information about functions) and processing information. In the present embodiment, the service definition information is information defining services (functions) that each apparatus can execute in cooperation with an external apparatus on the home network 22. The processing information is information about processing being executed by each apparatus, processing to be executed by each apparatus, and results of executed processing by each apparatus. Each apparatus transmits and receives the service definition information, and transmits and receives the processing information relating to the services. One or more display apparatuses collectively display the processing information about themselves and the processing information about one or more external apparatuses, and display services (functions) executable by each external apparatus in cooperation with the display apparatus. When a user selects a service, the display apparatus causes the selected service to be executed by an external apparatus capable of executing the selected service.

Accordingly, a user can check the processing information of each external apparatus on the display apparatus. Further, the user can cause a desired service (function) to be executed by an external apparatus by selecting the service (function) that can be executed by each external apparatus on the display apparatus.

[Configuration of the Television Receiver 200]

Next, the schematic configuration of the television receiver 200 and the digital recorder 220 included in the system 20 shown in FIG. 7 will be described with reference to FIGS. 8 and 9.

Figure 8:
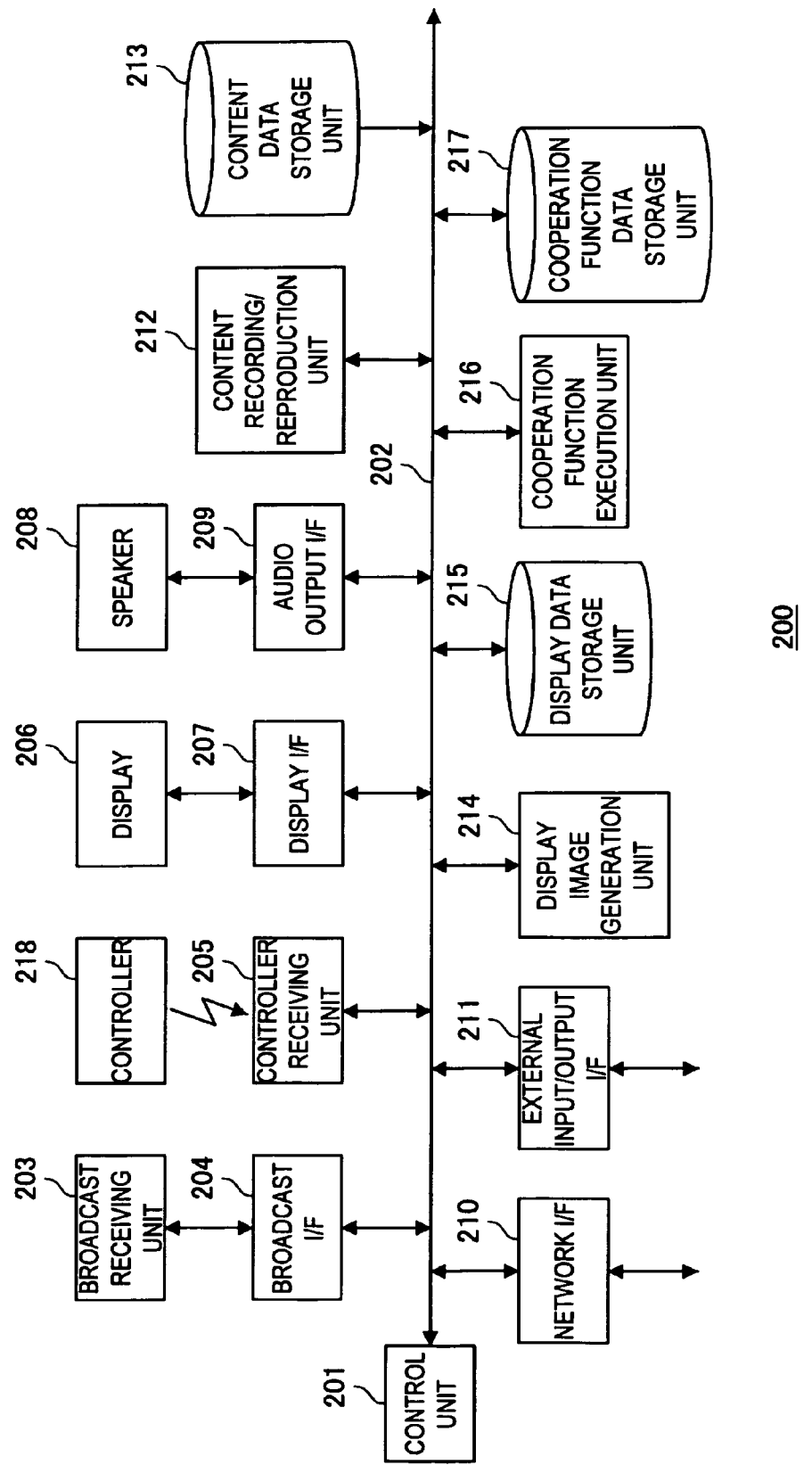
FIG. 8 is a block diagram schematically showing a configuration of a television receiver included in the system shown in FIG. 2.

As shown in FIG. 8, the television receiver 200 includes a control unit 201, a broadcast receiving unit 203, a broadcast interface (I/F) 204, a controller receiving unit 205, a display 206, and a display interface (I/F) 207. The television receiver 200 further includes a speaker 208, an audio output interface (I/F) 209, a network communication interface (I/F) 210, and an external input/output interface (I/F) 211. The television receiver 200 further includes a content recording/reproduction unit 212, a content data storage unit 213, a display image generation unit 214, a display data storage unit 215, a cooperation function execution unit 216, and a cooperation function data storage unit 217. The components having functions different from those of the television receiver 100 according to the first embodiment will be explained in the below.

The control unit 201 includes a CPU, a ROM, a RAM, and the like. The ROM stores programs and data for achieving various functions, for example. The RAM stores various data such as preference information and processing information to be described later, and the RAM provides a work area for execution of programs. In the control unit 201, the CPU reads a program stored in the ROM, and executes the program using the work area on the RAM, so as to perform various processing and perform controls on each unit via the connection bus 202. For example, the control unit 201 controls the content recording/reproduction unit 212 to perform recording and reproduction processing of a program content and perform program recommending processing for recommending a program content to a user on the basis of the program information and the preference information. Further, the control unit 201 cooperates with the cooperation function execution unit 216 to achieve a cooperation function with an external apparatus such as the digital recorder 220, to be described later.

The broadcast receiving unit 203 receives program information such as EPG (Electronic Program Guide) information and ECG (Electronic Content Guide) information along with a program content, and outputs the program content and the program information to the connection bus 202 via the broadcast I/F 204. The content recording/reproduction unit 212 stores data about the program content received by the broadcast receiving unit 203 in the content data storage unit 213. Further, the content recording/reproduction unit 212 reproduces the program content received by the broadcast receiving unit 203, and reproduces the program content data stored in the content data storage unit 213. The content data storage unit 213 is a recording medium for storing the data of the program content received by the broadcast receiving unit 203.

The display image generation unit 214 generates a display image to be displayed on the display 206 from a video signal decoded by the content recording/reproduction unit 212, program information received by the broadcast receiving unit 203, display data stored in the display data storage unit 215, and the like. The display image generation unit 214 generates a display image such as a program selection menu and a program table menu, which are to be described later. The display data storage unit 215 is a recording medium for storing various data used for generating the display image such as the program selection menu and the program table menu.

The cooperation function execution unit 216 cooperates with the control unit 201 using various modules to be described later to achieve a cooperation function with an external apparatus. The cooperation function execution unit 216 collectively displays the processing information and the like of the television receiver 200 and external apparatuses along with the program information, and causes an external apparatus to execute a function selected by a user from among the functions of the external apparatus displayed along with the program information. The cooperation function data storage unit 217 is a recording medium for storing data such as definition information which is necessary to execute a cooperation function to be described later.

The definition information includes device definition information for identifying the television receiver 200 and service definition information for defining services (functions) that the television receiver 200 can execute in cooperation with an external apparatus, as to be described later. The preference information is information representing a user's preference in programs. The preference information may be set by a user as a program selection condition, and may be generated and updated according to, a history of user operations (e.g., viewing, recording, timer viewing, and timer recording) and the like on the television receiver 200. The preference information (an example of the processing condition) is stored in the RAM, and is used to perform program recommendation processing.

The processing information is information representing processing being executed or to be executed by the television receiver 200 and results of the processing executed by the television receiver 200. Examples of the processing information include recommendation information (an example of the result of the executed processing) and recording/timer recording information (an example of the processing to be executed). The processing information is stored in the RAM, and is used to perform, for example, the program recommendation processing and the program recording processing.

[Overview of the Digital Recorder 220]

Figure 9:
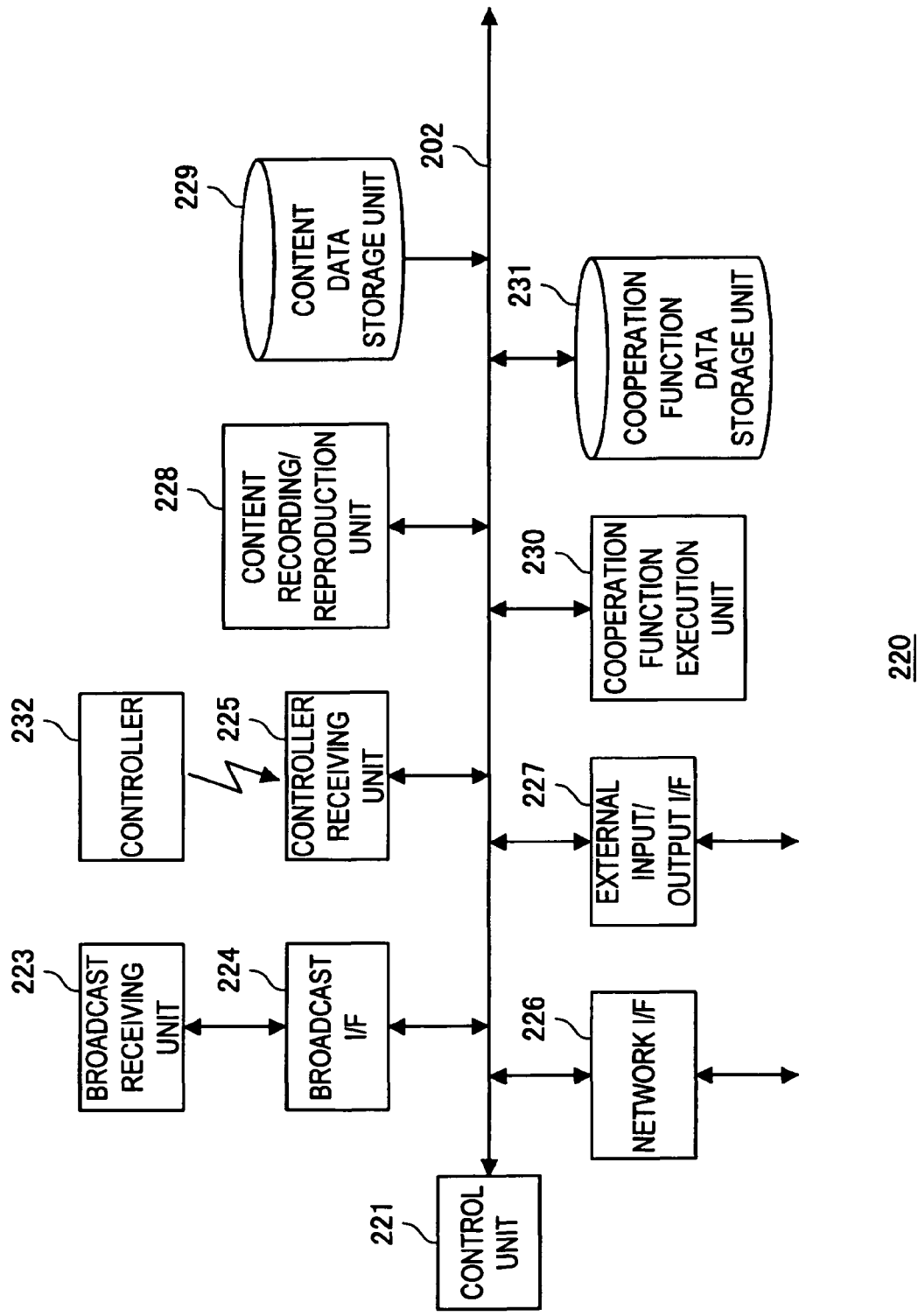
FIG. 9 is a block diagram schematically showing a configuration of a digital recorder included in the system shown in FIG. 7.

As shown in FIG. 9, the digital recorder 220 includes a control unit 221, a broadcast receiving unit 223, a broadcast I/F 224, a controller receiving unit 225, a network communication I/F 226, an external input/output I/F 227. Further, the digital recorder 220 includes a content recording/reproduction unit 228, a content data storage unit 229, a cooperation function execution unit 230, and a cooperation function data storage unit 231. Each unit of the digital recorder 220 has the same function as the corresponding one of the television receiver 200, and the explanations thereof will not be repeated.

[Configuration of Cooperation Functions]

Figure 10:
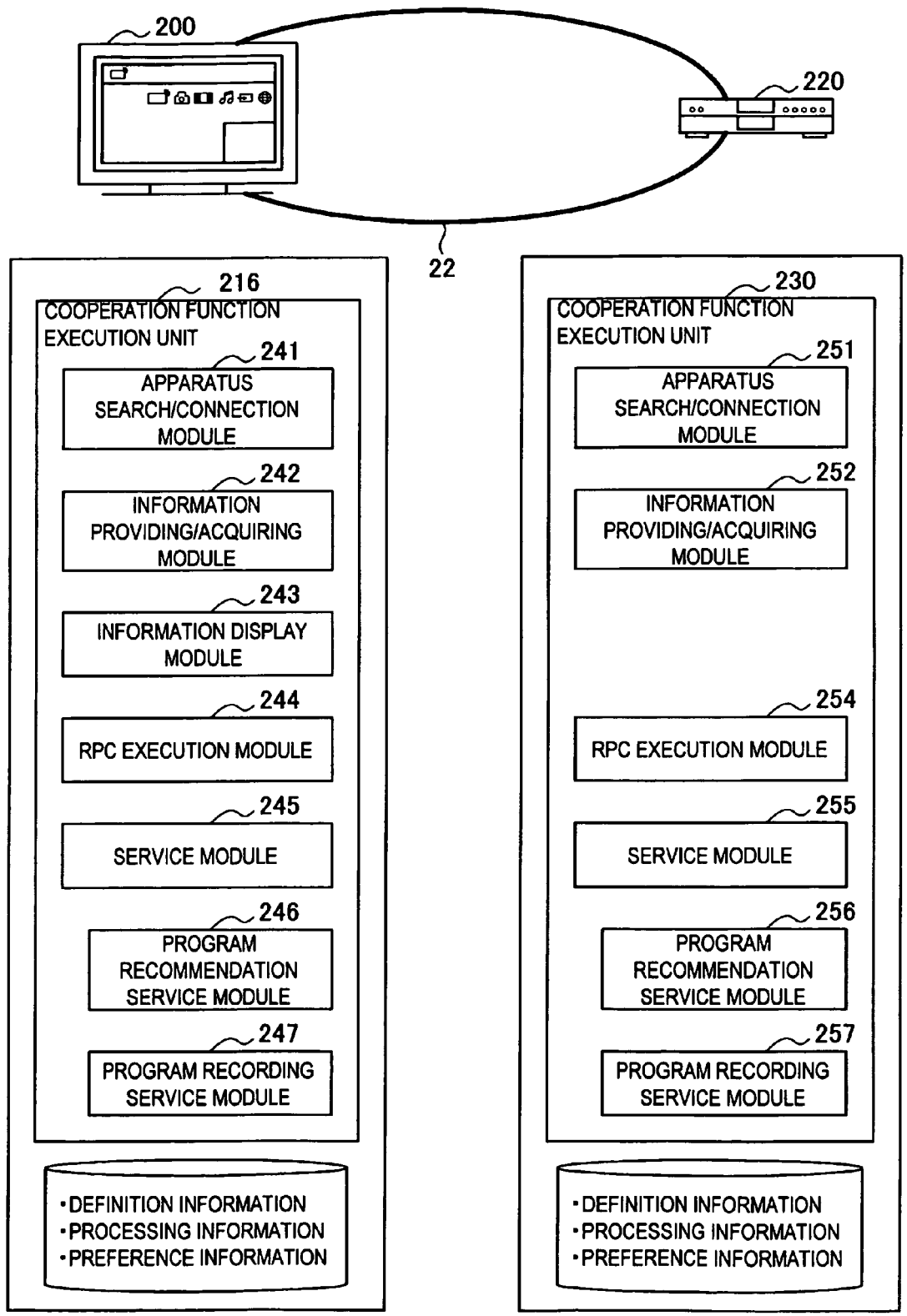
FIG. 10 is a figure showing a configuration of the cooperation function.

Next, the configuration of the cooperation function in the system 20 shown in FIG. 7 will be described with reference to FIGS. 10 and 11. FIG. 10 is a figure showing the configuration of the cooperation function. FIG. 11 is a figure showing the configuration of the definition information.

As shown in FIG. 10, the cooperation function execution unit 216 of the television receiver 200 includes an apparatus search/connection module 241, an information providing/acquiring module 242, an information display module 243, an RPC execution module 244, and various service modules 245. The cooperation function data storage unit 217 of the television receiver 200 stores the device definition information of the television receiver 200 and the service definition information of the service modules 245 of the cooperation function execution unit 216. On the other hand, the RAM of the television receiver 200 stores the processing information and the preference information managed by the television receiver 200

On the other hand, the cooperation function execution unit 230 of the digital recorder 220 includes an apparatus search/connection module 251, an information providing/acquiring module 252, an RPC execution module 254, and various service modules 255. the cooperation function data storage unit 231 of the digital recorder 220 stores the device definition information of the digital recorder 220 and the service definition information of the service modules 255 of the cooperation function execution unit 230. On the other hand, the RAM of the digital recorder 220 stores the processing information and the preference information managed by the digital recorder 220.

The apparatus search/connection modules 241 and 251 are modules for searching an external apparatus on the home network 22 via the network communication I/Fs 210 and 226 and establishing a network connection with the found external apparatus on the basis of the definition information sent to and received from the external apparatus. The information providing/acquiring modules 242 and 252 are modules for providing and obtaining information needed to execute the cooperation function such as the preference information and the processing information to and from the external apparatus via the network communication I/Fs 210 and 226. Each of the information providing/acquiring modules 242 and 252 functions as an information providing module for providing information to the external apparatus and/or an information acquiring module for acquiring information from the external apparatus.

The information display module 243 is a module for integrating the processing information stored in the RAM and the processing information acquired from the external apparatus by the information providing/acquiring module 242 and for displaying the integrated information. The RPC execution modules 244 and 254 are modules for executing a Remote Procedure Call (RPC) on the external apparatus via the network communication I/Fs 210 and 226. The various service modules 245 and 255 include modules 246, 247, 256, and 257 for executing various services (processing) that can be executed as cooperation functions with the external apparatus such as the program recommendation service and the program recording service.

Each of the apparatus search/connection modules 241 and 251 and the information providing/acquiring modules 242 and 252 functions as an information acquiring unit and/or an information providing unit. The information display module 243 functions as an information display unit. Each of the RPC execution modules 244 and 254 functions as a function execution unit. Each of the service modules 245 and 255 functions as a function execution unit and/or a processing execution unit.

The cooperation function execution unit 216 of the television receiver 200 and the cooperation function execution unit 230 of the digital recorder 220 use the above modules, the processing information, and the preference information to achieve a cooperation function between the television receiver 200 and the digital recorder 220 via the home network 22. It should be noted that the digital recorder 220 according to the present embodiment does not use the information display module, but an external apparatus having a display function can collectively display the processing information and the like using the information display module in the same manner as the television receiver 200.

Next, the definition information will be described with reference to FIG. 11. As described above, the definition information includes the device definition information for identifying an apparatus and the service definition information for defining services (functions) that each apparatus can execute by cooperating with an external apparatus.

As shown in FIG. 11, the device definition information includes a device ID, a device name, a device address, and device supplementary information. The device ID is an identifier unique to an apparatus, and the device name is a name set by the apparatus or the user in order to facilitate the identification of the apparatus. The device address is an address that can identify an apparatus on the home network 22 such as an IP address and a host name. The device supplementary information is supplementary information arbitrarily set by the apparatus or the user.

Further, the service definition information includes a service name, a service version, a service location path, a service providing device ID, and service supplementary information. The service definition information is defined for each service that can be executed in cooperation with an external apparatus, such as the program recommendation service and the program recording service. In other words, the service definition information is defined for each of the service modules 245 and 255 used by the cooperation function execution units 216 and 230, such as program recommendation service modules 246 and 256 and program recording service modules 247 and 257. The service name is a name set for each service. The service version is information representing the version of a service.

The service location path includes an RPC protocol, a device ID, and service location information of an apparatus. The service location information is made as text information similar to a URI (Uniform Resource Locator) in order to facilitate identification of a service. The service providing device ID is an identifier corresponding to the device ID of the above device definition information. The service supplementary information is supplementary information arbitrarily set by the apparatus or the user.

[Cooperation Function]

Figure 13:
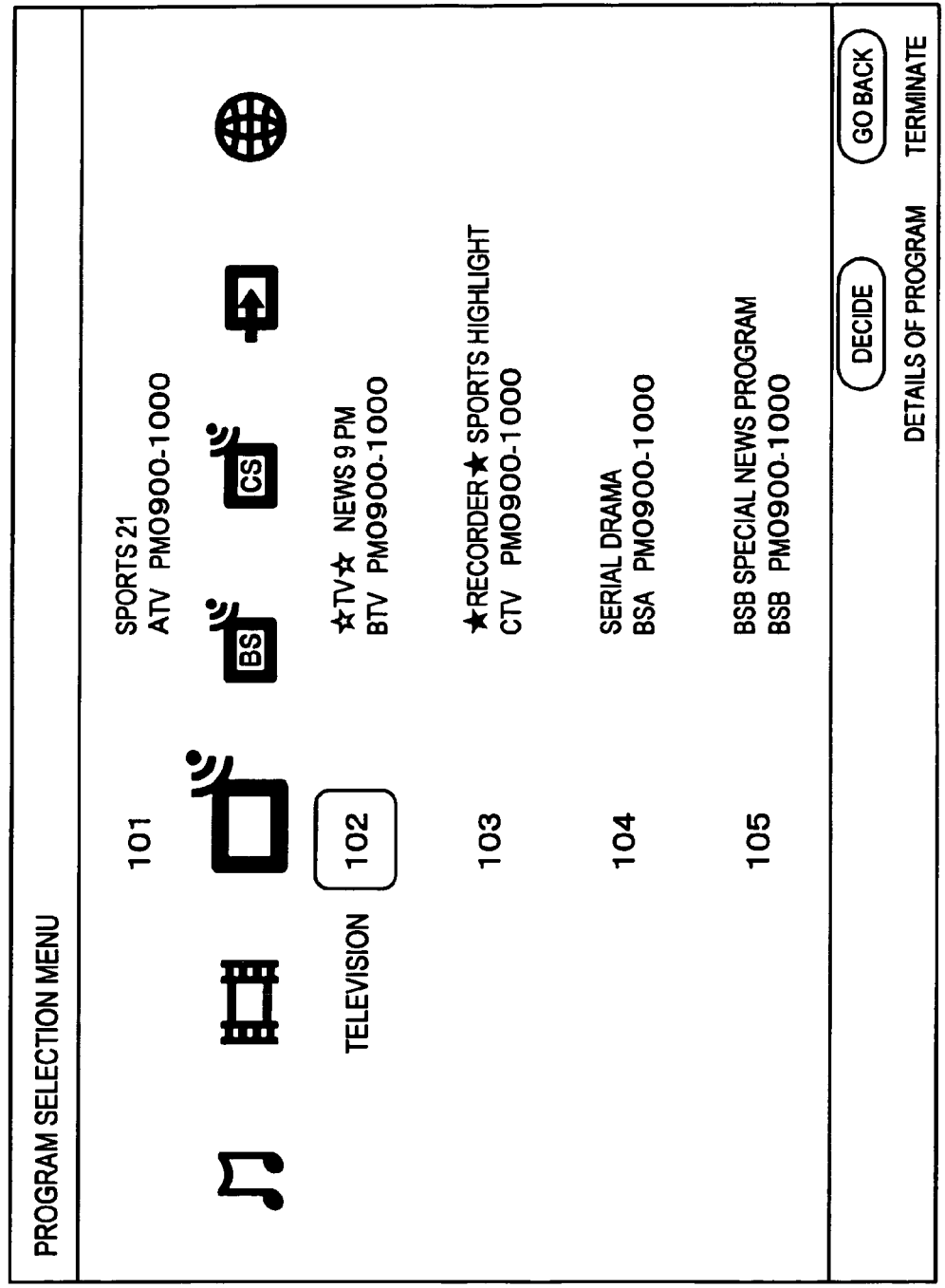
FIG. 13 is a figure showing an exemplary execution of the cooperation function for collectively displaying recommendation information for the television receiver and the digital recorder on the television receiver by using a program recommendation service.
Figure 15:
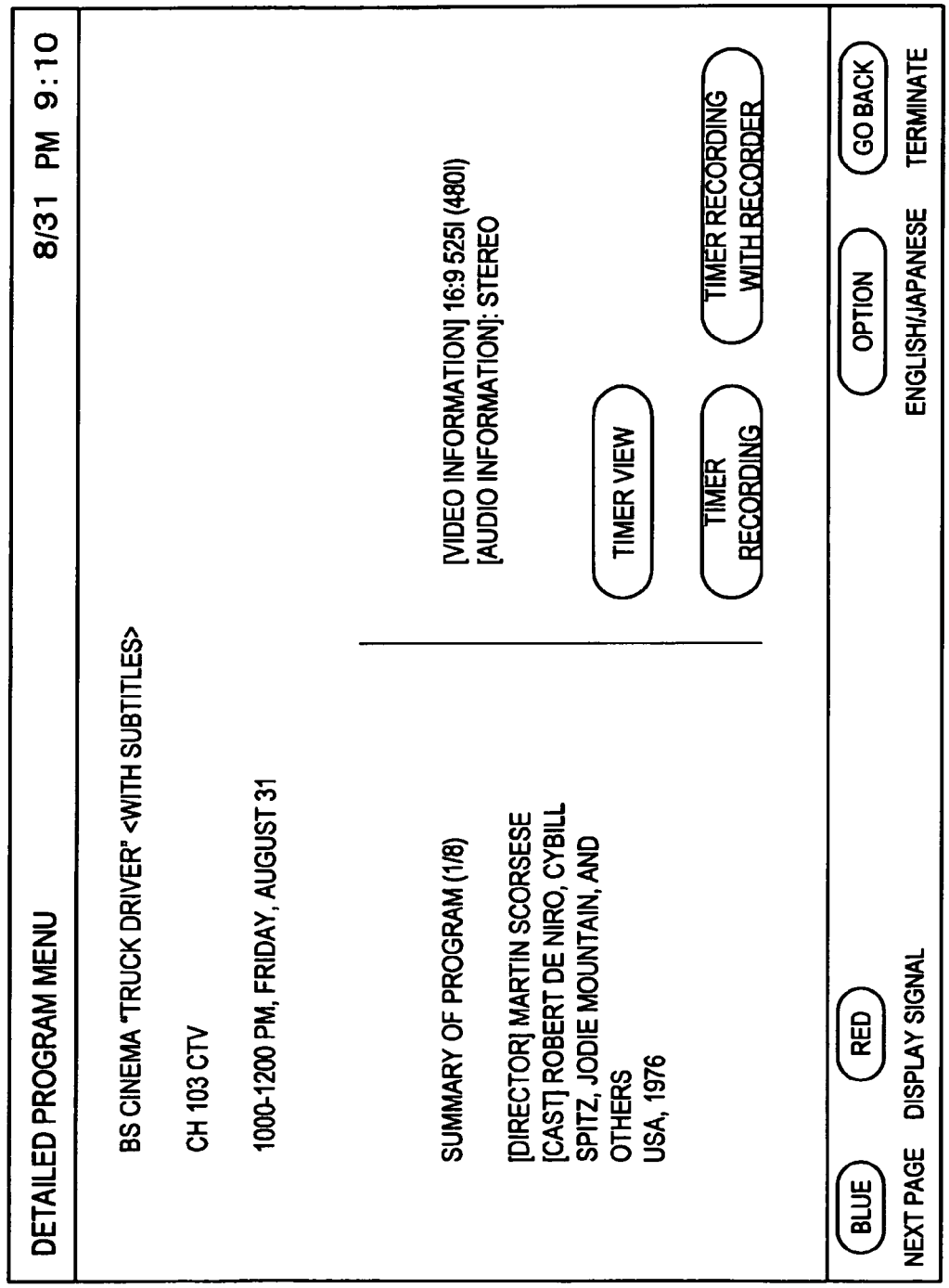
FIG. 15 is a figure showing an exemplary execution of the cooperation function for executing a service of the digital recorder displayed along with the program information on the television receiver on the digital recorder.

The cooperation function of the system 20 according to the present embodiment will be hereinafter described with reference to FIGS. 12 to 15. FIG. 12 is a figure showing an execution sequence of the cooperation function of the system 20. FIGS. 13 to 15 are figures showing an exemplary execution of the cooperation function. In the following explanation, a case where the television receiver 200 collectively displays the processing information and the like of the television receiver 200 and the digital recorder 220 will be first described. Subsequently, a case where the digital recorder 220 executes a service of the digital recorder 220 displayed on the television receiver 200 will be described.

As shown in FIG. 12, the execution sequence of the cooperation function can be divided into a connection establishing sequence, an information collecting sequence, and a display/execution sequence. Each sequence will be hereinafter described in order.

[1. Connection Establishing Sequence]

The control unit 201 of the television receiver 200 causes the cooperation function execution unit 216 to start the connection establishing sequence at a predetermined timing such as at the start up of the television receiver 200. The cooperation function execution unit 216 firstly uses the apparatus search/connection module 241 to search an external apparatus on the home network 22 (step S700). At this time, the apparatus search/connection module 241 searches an apparatus on the home network 22 by using a protocol such as UPnP (Universal Plug and Play) and Multicast DNS.

When the apparatus search/connection module 241 receives a search response from the cooperation function execution unit 230 of the digital recorder 220 (S702), the apparatus search/connection module 241 transmits the device definition information of the television receiver 200 and a transmission request for the definition information to the cooperation function execution unit 230 (S704). The cooperation function execution unit 230 of the digital recorder 220 transmits the suitable service information identified based on the device definition information of the television receiver 200 along with the device definition information of the digital recorder 220 to the apparatus search/connection module 241 (S706).

When the cooperation function execution unit 216 of the television receiver 200 receives the service definition information, the cooperation function execution unit 216 makes a determination whether the cooperation function can be executed with the digital recorder 220. The cooperation function execution unit 216 confirms the type of data transmitted to and received from the digital recorder 220 during the execution of the cooperation function and method of transmission and reception and the like on the basis of the service version included in the service definition information.

When the cooperation function execution unit 216 determines that the cooperation function can be executed, the cooperation function execution unit 216 establishes a network connection between the television receiver 200 and the digital recorder 220 (S708) to finish the connection establishing sequence. On the other hand, when the cooperation function execution unit 216 determines that the cooperation function cannot be executed, the cooperation function execution unit 216 finishes the connection establishing sequence without establishing any network connection. In the following, the information collecting sequence and the display/execution sequence will be explained on the assumption that a network connection is established between the television receiver 200 and the digital recorder 220.

[2. Information Collecting Sequence]

The control unit 201 causes the cooperation function execution unit 216 to start the information collecting sequence at a predetermined timing such as after the connection establishing sequence is finished or after the execution request of the cooperation function is received. The execution request of the cooperation function is made when a user requests display of a program selection menu and a program table menu, for example, which are to be described later. The cooperation function execution unit 216 uses the information acquiring module 242 to request the cooperation function execution unit 230 of the digital recorder 220 to provide information from a predetermined service module 255 of the digital recorder 220 (S710). At this occasion, the information acquiring module 242 requests the cooperation function execution unit 230 of the digital recorder 220 so that the predetermined service module 255, which is previously set in the television receiver 200 or determined according to a user operation, provides the preference information, the processing information and the like.

The cooperation function execution unit 230 uses the predetermined service module 255 to obtain the preference information, the processing information, and the like and uses the information providing module 252 to transmit the preference information, the processing information and the like to the information acquiring module 242 on the basis of the service definition information of the service module 255 (S712). When the information acquiring module 242 receives, e.g., the preference information and the processing information from the cooperation function execution unit 230 of the digital recorder 220, the information acquiring module 242 stores the preference information, the processing information, and the like to the RAM along with corresponding information stored in the RAM of the television receiver 200, thereby collecting information (S714).

In the following explanation, the information collecting sequence performed using the program recommendation service modules 246 and 256 and the program recording service modules 247 and 257, as an example of the predetermined service modules 245 and 255, will be described. The program recommendation service modules 246 and 256 are modules for recommending a program content based on the preference information and generating recommendation information indicating the recommended program content. The program recording service modules 247 and 257 are modules for recording a program content and programming a timer recording on the basis of the recording/timer recording information.

When the program recommendation service module 256 is used, the information acquiring module 242 obtains, for example, the recommendation information indicating a program recommended based on the preference information stored in the digital recorder 220, from the program recommendation service module 256 via the information providing module 252. Then, the information acquiring module 242 collects the acquired recommendation information along with the recommendation information stored in the television receiver 200. When the program recording service module 257 is used, the information acquiring module 242 obtains, for example, the recording/timer recording information indicating a program being recorded or to be timer-recorded by the digital recorder 220, from the program recording service module 257 via the information providing module 252. Then, the information acquiring module 242 collects the acquired recording/timer recording information along with the recording/timer recording information stored in the television receiver 200.

[3. Display/Execution Sequence]

The control unit 201 causes the cooperation function execution unit 216 to start the display/execution sequence at a predetermined timing after the information collecting sequence is finished or after the execution request of the cooperation function is acquired, for example. The cooperation function execution unit 216 uses the information display module 243 to display the information collected by the information acquiring module 242 along with, e.g., the processing selection menu and the program table menu (S716). The information display module 243 displays predetermined information previously set in the television receiver 200 or determined according to a user operation.

Further, on the basis of the service definition information of the service modules 255 acquired from the digital recorder 220, the information display module 243 displays function information of the digital recorder 220 along with the processing selection menu and the program table menu, for example (S718). The function information is information indicating services (functions) that each apparatus can execute in cooperation with an external apparatus. In other words, the function information of the digital recorder 220 displayed on the information display module 243 indicates the functions that can be called by the television receiver 200 via RPC so as to be executed by the digital recorder 220.

The cooperation function execution unit 216 identifies the function information of the digital recorder 220 based on the service definition information of each of the service modules 255. For example, the function information of the digital recorder 220 is identified as the functions such as acquiring, providing, and updating of the recommendation information corresponding to the program recommendation service module 256, and is identified as the functions such as recording and timer recording corresponding to the program recording service module 257.

When the function information of the digital recorder 220 being displayed is selected, the cooperation function execution unit 216 uses the RPC execution module 244 to request a corresponding service module 255 to execute the selected function. On the basis of the service definition information corresponding to the selected function information, the RPC execution module 244 transmits an execution request to the corresponding service module 255 according to the service location path (S720). When the corresponding service module 255 receives the execution request, the corresponding service module 255 executes the corresponding function (S722), and transmits a finish response to the cooperation function execution unit 216 (S724). When the cooperation function execution unit 216 receives the finish response, the cooperation function execution unit 216 uses the information display module 243 to display an execution finish of the selected function (S726).

[Exemplary Execution of the Cooperation Function]

In the exemplary execution shown in FIG. 13, the television receiver 200 uses the program recommendation service to collectively display the processing information (the recommendation information) of the television receiver 200 and the digital recorder 220.

FIG. 13 shows the program selection menu displayed on the screen of the television receiver 200. The program selection menu shows a list of programs that can be viewed, recorded, programmed to be viewed, or programmed to be timer-recorded with the recommendation information thereof. FIG. 13 shows program information (e.g., a provided channel, a provider, a program title, a providing time) about program contents 1-1 (Sports 21), 2-1 (News 9 PM), 3-1 (Sports Highlight), 4-1 (Serial Drama), 5-1 (BSB Special News Program). As the recommendation information, a "TV" mark is shown with the program information of the program content 2-1, and a "Recorder" mark is shown with the program information of the program content 3-1. The recommendation information shown with the program information represents an apparatus that recommends the program content. For example, the recommendation information shown in FIG. 13 indicates that the television receiver 200 recommends the program content 2-1 and that the digital recorder 220 recommends the program content 3-1.

Accordingly, a user can select a program content suitable for the user's own preference while checking the recommendation information of the television receiver 200 and the digital recorder 220 on the television receiver 200.

In the program selection menu, "Decide" button for viewing the details of the program is shown. As to be described later, a user can check the details of the program content by operating the "Decide" button to select a program content from the program selection menu.

In the exemplary execution shown in FIG. 13, the recommendation information of the television receiver 200 and the digital recorder 220 are collectively displayed. But, instead of the recommendation information, the preference information of the television receiver 200 and the digital recorder 220 may be collected by the television receiver 200 and the television receiver 200 generates and displays the recommendation information on the basis of the collected preference information. In such case, it is not necessary for the digital recorder 220 to have the program recommendation function.

Further, in another exemplary execution of the cooperation function using the program recommendation service, the preference information is transmitted in at least one direction between the cooperation function execution unit 216 of the television receiver 200 and the cooperation function execution unit 230 of the digital recorder 220.

At a predetermined timing after a predetermined update period passes or after an execution request of an update processing is received, for example, the cooperation function execution unit 216 of the television receiver 200 transmits the preference information from the program recommendation service module 246 via the information providing/acquiring module 242. When the program recommendation service module 256 of the digital recorder 220 receives the preference information, the program recommendation service module 256 updates the preference information stored in the RAM, and transmits a confirmation response of the finish of updating to the information acquiring/providing module 242, which is a provider of the preference information. Then, the program recommendation service module 256 of the digital recorder 220 recommends a program content on the basis of the updated preference information, and generates the preference information. In the above explanation, the television receiver 200 transmits the preference information to the digital recorder 220. But a case where the digital recorder 220 transmits the preference information to the television receiver 200 can also be explained in the same manner.

Accordingly, a user can select a program content suitable for the user's own preference from among the program contents recommended based on the preference information collected by the television receiver 200 and/or the digital recorder 220.

In the exemplary execution shown in FIG. 14, the television receiver 200 collectively displays the processing information (the recording/timer recording information) of the television receiver 200 and the digital recorder 220 using the program recording service.

FIG. 14 shows a program table menu displayed on the screen of the television receiver 200. In the program table menu, program information (program titles and providing times and the like) of a plurality of program contents and the recording/timer recording information are shown in sections according to the provided channel and the providing time. As the recording/timer recording information, a "Recorder Recording" mark is shown with the program information of the program content 1-1 (Sports 21), and a "TV Timer Recording" mark is shown with the program information of the program content 2-2 (Sports 10 PM). The recording/timer recording information shown with the program information indicates a processing state, such as recording and timer recording, of the program content. For example, the recording/timer recording information shown in FIG. 14 indicates that the program content 1-1 is being recorded by the digital recorder 220 and that the program content 2-2 is programmed to be time-recorded by the television receiver 200.

Accordingly, the user can appropriately select a program content to be viewed, recorded, programmed to be viewed, programmed to be timer-recorded, and the like, while checking the recording/timer recording information of the television receiver 200 and the digital recorder 220 on the television receiver 200.

Also in the program table menu, "Decide" button for viewing the details of the program is shown. As to be described later, a user can check the details of the program content by operating the "Decide" button to select a program content from the program table menu.

In the exemplary execution shown in FIG. 15, the services (functions) of the digital recorder 220 displayed along with the program information (the program details) on the television receiver 200 are executed by the digital recorder 220.

FIG. 15 shows a detailed program menu showing the details of the program content 3-2 (Truck Driver) selected from the program selection menu or the program table menu. The detailed program menu shows the program information (e.g., a provided channel, a provider, a program title, a providing time, a summary of program, and video/audio information) of the program content 3-2 along with selectable functions. Operation buttons "Timer View", "Timer Recording", and "Timer Recording with Recorder", corresponding to the selectable functions, are shown. Among them, the "Timer Recording with Recorder" button corresponds to the function information of the digital recorder 220. The function information shown with the program information represents functions that can be executed on the selected program by the digital recorder 220. For example, the function information shown in FIG. 15 indicates that the digital recorder 220 can be programmed to timer-record the program content 3-2.

When the "Timer View" button or the "Timer Recording" button are selected, the control unit 201 of the television receiver 200 programs timer viewing or timer recording so as to perform viewing processing or recording processing of the program content 3-2 at the programmed time. On the other hand, when "Timer Recording with Recorder" button is selected, the cooperation function execution unit 216 of the television receiver 200 uses the RPC execution module 244 to request the program recording service module 257 to execute timer recording on the basis of the service definition information of the program recording service module 257. When the program recording service module 257 receives the execution request, the program recording service module 257 cooperates with the control unit 201 to program timer recording so as to execute recording processing of the program content 3-2 at the programmed time. After the program recording service module 257 programs timer recording, the program recording service module 257 transmits a finish response and the updated recording/timer recording information to the cooperation function execution unit 216 of the television receiver 200. When the cooperation function execution unit 216 receives the recording/timer recording information, the cooperation function execution unit 216 uses the information display module 243 to display the updated recording/timer recording information.

Accordingly, a user can cause the digital recorder 220 to execute the corresponding function by operating the television receiver 200 to select the function information of the digital recorder 220 displayed on the television receiver 200.

As described above, according to the system 20 according to the present embodiment, the processing information and the information about the functions of one or more external apparatuses are acquired from the respective external apparatuses, and the processing information and the information thereabout are displayed along with the program information about one or more program contents. Further, the selected function with respect to the selected program content can be executed by the external apparatus. Accordingly, the information processing apparatuses can cooperate without any dependence relation between the information processing apparatuses. Further, cumbersome operations are not necessary and erroneous operations can be prevented, and the convenience of cooperation between apparatuses can be improved.

It should be understood by those skilled in the art that various modifications, combinations, sub-combinations and alterations may occur depending on design requirements and other factors insofar as they are within the scope of the appended claims or the equivalents thereof.

In the above embodiment, the cooperation function is executed using the system 20 including the television receiver 200 and the digital recorder 220. But a case where the cooperation function is executed using a system including one or more display apparatuses and one or more other apparatuses can also be explained in the same manner. The more apparatuses the system to which the information processing method according to the present invention is applied, the more significant effect of the cooperation function a user can obtain.

In the above embodiment, the program recommendation processing and the program recording processing are performed using the cooperation function. But the information processing method according to the present invention can also be applied to a case where a processing other than the program recommendation processing and the program recording processing is performed using the cooperation function.

What is claimed is:
1. An information processing apparatus, comprising:
an information acquiring unit for acquiring, from one or more external apparatuses connected via a network, processing information about a processing to be executed by each of the external apparatuses and/or about a result of a processing executed thereby and information about a function that each of the external apparatuses can execute in cooperation with the information processing apparatus;

an information display unit for displaying the processing information of each of the external apparatuses and program information about one or more program contents and displaying, on the basis of the information about the function of each of the external apparatuses, one or more functions that can be executed by each of the external apparatuses with respect to the one or more program contents; and a function execution unit for causing one or more of the external apparatuses capable of executing a function selected from among the one or more functions to execute the selected function with respect to a program content selected from among the one or more program contents, said information processing apparatus being a television receiver and the one or more external apparatuses includes a digital recorder so that said television receiver is able to (i) display one or more functions that can be executed by the digital recorder without having previously had information regarding the digital recorder stored therein and (ii) cause the digital recorder to execute a respective selected function, wherein the information about a function includes behavior information specifying an operation method when the function is selected, the behavior information including information representing either of an embedded type and a download type.

2. The information processing apparatus according to claim 1, wherein along with the program information about the one or more program contents, the information display unit displays processing information about a processing to be executed by the information processing apparatus and/or about a result of a processing executed thereby, and the information display unit further displays, on the basis of information about a function of the information processing apparatus, one or more functions that can be executed by the information processing apparatus with respect to the one or more program contents.

3. The information processing apparatus according to claim 1 further comprising:

a processing execution unit for executing a processing with respect to a program content, wherein the information acquiring unit further obtains, from each of the external apparatuses, the processing condition used by each of the external apparatuses for the processing, the processing execution unit executes the processing with respect to the program content on the basis of the processing condition used by the information processing apparatus and each of the external apparatuses for the processing, and the information display unit further displays a result of the processing executed by the processing execution unit along with the program information of the one or more program contents.

4. An information processing apparatus comprising:

an information providing unit for providing, to an external apparatuses connected via a network, processing information about a processing to be executed by the information processing apparatus and/or about a result of a processing executed thereby and information about a function that the information processing apparatus can execute in cooperation with one or more of the external apparatus;

a function execution unit for executing a function, selected on the external apparatuses from among the one or more functions, with respect to a program content selected on the external apparatuses from among the one or more program contents, wherein along with the program information about the one or more program contents, one or more of the external apparatuses display the processing information and display, on the basis of the information about the function, the one or more functions that can be executed with respect to the one or more program contents, said information processing apparatus being a digital recorder and one of the external apparatus being a television receiver so that said television receiver is able to (i) display one or more functions that can be executed by the digital recorder without having previously had information regarding the digital recorder stored therein and (ii) cause the digital recorder to execute a respective selected function, wherein the information about a function includes behavior information specifying an operation method when the function is selected, the behavior information including information representing either of an embedded type and a download type.

5. The information processing apparatus according to claim 4 further comprising:

a processing execution unit for executing a processing with respect to a program content, wherein the information providing unit further provides to one or more of the external apparatuses a processing condition used by the information processing apparatus for the processing in order to cause one or more of the external apparatuses to display the result of the processing executed by one or more of the external apparatuses along with the program information about the one or more program contents and further cause one or more of the external apparatuses to execute the processing with respect to the program content on the basis of the processing condition used by the information processing apparatus and one or more of the external apparatuses for the processing.

6. An information processing system comprising:

an information processing apparatus; and one or more external apparatuses, wherein the information processing apparatus includes:

an information acquiring unit for acquiring, from the one or more external apparatuses connected via a network, processing information about a processing to be executed by each of the external apparatuses and/or about a result of a processing executed thereby and information about a function that each of the external apparatuses can execute in cooperation with the information processing apparatus;

an information display unit for displaying the processing information of each of the external apparatuses and program information about one or more program contents and displaying, on the basis of the information about the function of each of the external apparatuses, one or more functions that can be executed by each of the external apparatuses with respect to the one or more program contents; and a first function execution unit for causing one or more of the external apparatuses capable of executing a function selected from among the one or more functions to execute the selected function with respect to a program content selected from among the one or more program contents, and wherein the external apparatus includes:

an information providing unit for providing the processing information and the information about the function to the information processing apparatus; and a second function execution unit for executing the selected function with respect to the selected program content, said information processing apparatus being a television receiver and the one or more external apparatuses includes a digital recorder so that said television receiver is able to (i) display one or more functions that can be executed by the digital recorder without having previously had information regarding the digital recorder stored therein and (ii) cause the digital recorder to execute a respective selected function, wherein the information about a function includes behavior information specifying an operation method when the function is selected, the behavior information including information representing either of an embedded type and a download type.

7. An information processing method for an information processing apparatus, comprising the steps of:

acquiring, from one or more external apparatuses connected via a network, processing information about a processing to be executed by each of the external apparatuses and/or about a result of a processing executed thereby and information about a function that each of the external apparatuses can execute in cooperation with the information processing apparatus;

displaying the processing information of each of the external apparatuses and program information about one or more program contents and displaying, on the basis of the information about the function of each of the external apparatuses, one or more functions that can be executed by each of the external apparatuses with respect to the one or more program contents; and causing one or more of the external apparatuses capable of executing a function selected from among the one or more functions to execute the selected function with respect to a program content selected from among the one or more program contents, said information processing apparatus being a television receiver and the one or more external apparatuses includes a digital recorder so that said television receiver is able to (i) display one or more functions that can be executed by the digital recorder without having previously had information regarding the digital recorder stored therein and (ii) cause the digital recorder to execute a respective selected function, wherein the information about a function includes behavior information specifying an operation method when the function is selected, the behavior information including information representing either of an embedded type and a download type.

8. A non-transitory computer-readable storage medium having a program recorded thereon for causing a computer to execute an information processing method for an information processing apparatus, comprising the steps of:

acquiring, from one or more external apparatuses connected via a network, processing information about a processing to be executed by each of the external apparatuses and/or about a result of a processing executed thereby and information about a function that each of the external apparatuses can execute in cooperation with the information processing apparatus;

displaying the processing information of each of the external apparatuses and program information about one or more program contents and displaying, on the basis of the information about the function of each of the external apparatuses, one or more functions that can be executed by each of the external apparatuses with respect to the one or more program contents; and causing one or more of the external apparatuses capable of executing a function selected from among the one or more functions to execute the selected function with respect to a program content selected from among the one or more program contents, said information processing apparatus being a television receiver and the one or more external apparatuses includes a digital recorder so that said television receiver is able to (i) display one or more functions that can be executed by the digital recorder without having previously had information regarding the digital recorder stored therein and (ii) cause the digital recorder to execute a respective selected function, wherein the information about a function includes behavior information specifying an operation method when the function is selected, the behavior information including information representing either of an embedded type and a download type.

9. An information processing apparatus comprising:

a receiving unit for receiving, from an external apparatus connected to the information processing apparatus via a network, function information about one or more functions of the external apparatus and a function display request for displaying a list of the functions included in the function information;

a display unit for displaying, in response to the function display request, the list of the functions of the external apparatus included in the function information;

a selection receiving unit for receiving information representing one or more of the functions selected by a user from among the list of the functions displayed on the display unit; and a cooperation function execution unit for causing the external apparatus to execute one or more of the functions selected by the user, said information processing apparatus being a television receiver and the external apparatus being a digital recorder so that said television receiver is able to (i) display one or more functions that can be executed by the digital recorder without having previously had information regarding the digital recorder stored therein and (ii) cause the digital recorder to execute a respective selected function or functions, wherein the information about a function includes behavior information specifying an operation method when the function is selected, the behavior information including information representing either of an embedded type and a download type.

10. The information processing apparatus according to claim 9, wherein the function information includes identification information corresponding to each of the functions, and the cooperation function execution unit transmits to the external apparatus the identification information corresponding to one or more of the functions selected by the user.

11. The information processing apparatus according to claim 9, wherein the function information includes information about a source location from which a program corresponding to each of the functions is acquired, and the cooperation function execution unit causes the external apparatus to execute one or more of the functions selected by acquiring the program from the source location of the program corresponding to one or more of the functions selected by the user and executing the acquired program.

12. An information processing apparatus comprising:

an external apparatus search unit for searching an external apparatus connected via a network; and a transmitting unit for transmitting, to the external apparatus, function information about one or more functions and a function display request for causing the external apparatus to display a list of the one or more functions, said external apparatus being a television receiver and the information processing apparatus being a digital recorder so that said television receiver is able to display one or more functions that can be executed by the digital recorder without having previously had information regarding the digital recorder stored therein, wherein the information about a function includes behavior information specifying an operation method when the function is selected, the behavior information including information representing either of an embedded type and a download type.

13. The information processing apparatus according to claim 12, wherein the function information includes identification information corresponding to each of the functions, and the information processing apparatus receives from the external apparatus the identification information corresponding to one or more of the functions selected by a user from among the functions included in the function information, and executes one or more of the functions corresponding to the identification information.

14. The information processing apparatus according to claim 12, wherein the function information includes information about a source location from which a program corresponding to each of the functions is acquired, and the external apparatus executes the program corresponding to one or more of the functions selected by the user from among the functions included in the function information, thereby executing one or more of the functions selected.

15. The information processing apparatus according to claim 12, wherein the transmitting unit selects the one or more functions included in the function information in accordance with a type of the external apparatus searched by the external apparatus search unit.

16. An information processing method for use with an information processing apparatus, said method comprising the steps of:

receiving, from an external apparatus connected via a network, function information about one or more functions of the external apparatus and a function display request for displaying a list of the functions included in the function information;

displaying, in response to the function display request, the list of the functions of the external apparatus included in the function information;

receiving information representing one or more of the functions selected by a user from among the list of the functions displayed in the step for displaying; and causing the external apparatus to execute one or more of the functions selected by the user, said information processing apparatus being a television receiver and the external apparatus being a digital recorder so that said television receiver is able to (i) display one or more functions that can be executed by the digital recorder without having previously had information regarding the digital recorder stored therein and (ii) cause the digital recorder to execute a respective selected function, wherein the information about a function includes behavior information specifying an operation method when the function is selected, the behavior information including information representing either of an embedded type and a download type.

* * * * *